US012386944B2

(12) United States Patent
Niemi

(10) Patent No.: US 12,386,944 B2
(45) Date of Patent: Aug. 12, 2025

(54) STAGGERED AUTHENTICATION FOR DATA TRANSFER

(71) Applicant: NVIDIA Corporation, Santa Clara, CA (US)

(72) Inventor: Aki Petteri Niemi, Vancouver (CA)

(73) Assignee: NVIDIA Corporation, Santa Clara, CA (US)

( * ) Notice: Subject to any disclaimer, the term of this patent is extended or adjusted under 35 U.S.C. 154(b) by 282 days.

(21) Appl. No.: 18/142,311

(22) Filed: May 2, 2023

(65) Prior Publication Data

US 2024/0370550 A1     Nov. 7, 2024

(51) Int. Cl.
*G06F 21/44*     (2013.01)
*G06F 21/60*     (2013.01)

(52) U.S. Cl.
CPC ............ *G06F 21/44* (2013.01); *G06F 21/602* (2013.01)

(58) Field of Classification Search
CPC ............... G06F 21/44; G06F 21/602
See application file for complete search history.

(56) References Cited

U.S. PATENT DOCUMENTS

2024/0242471 A1\* 7/2024 Lev ..................... G06F 21/645
2024/0314367 A1\* 9/2024 Jenks .................... H04L 9/3247

\* cited by examiner

*Primary Examiner* — Huan V Doan
(74) *Attorney, Agent, or Firm* — Lowenstein Sandler LLP

(57) ABSTRACT

Disclosed are apparatuses, systems, and techniques that implement efficient staggered authentication of sensor data in real-time streaming applications. In one embodiment, a processing device establishes an authentication schedule for a plurality of sensors and receives units of data from the sensors. The units of data are received over multiple times, with the processing device receiving, from respective sensors, a plurality of sub-units of data; selecting, using the authentication schedule, a number of one or more sub-units of data from the received sub-units of data; and performing an authentication of the one or more selected sub-units of data. The processing device determines authenticity of the units of data using the performed authentications of the sub-units of data.

20 Claims, 10 Drawing Sheets

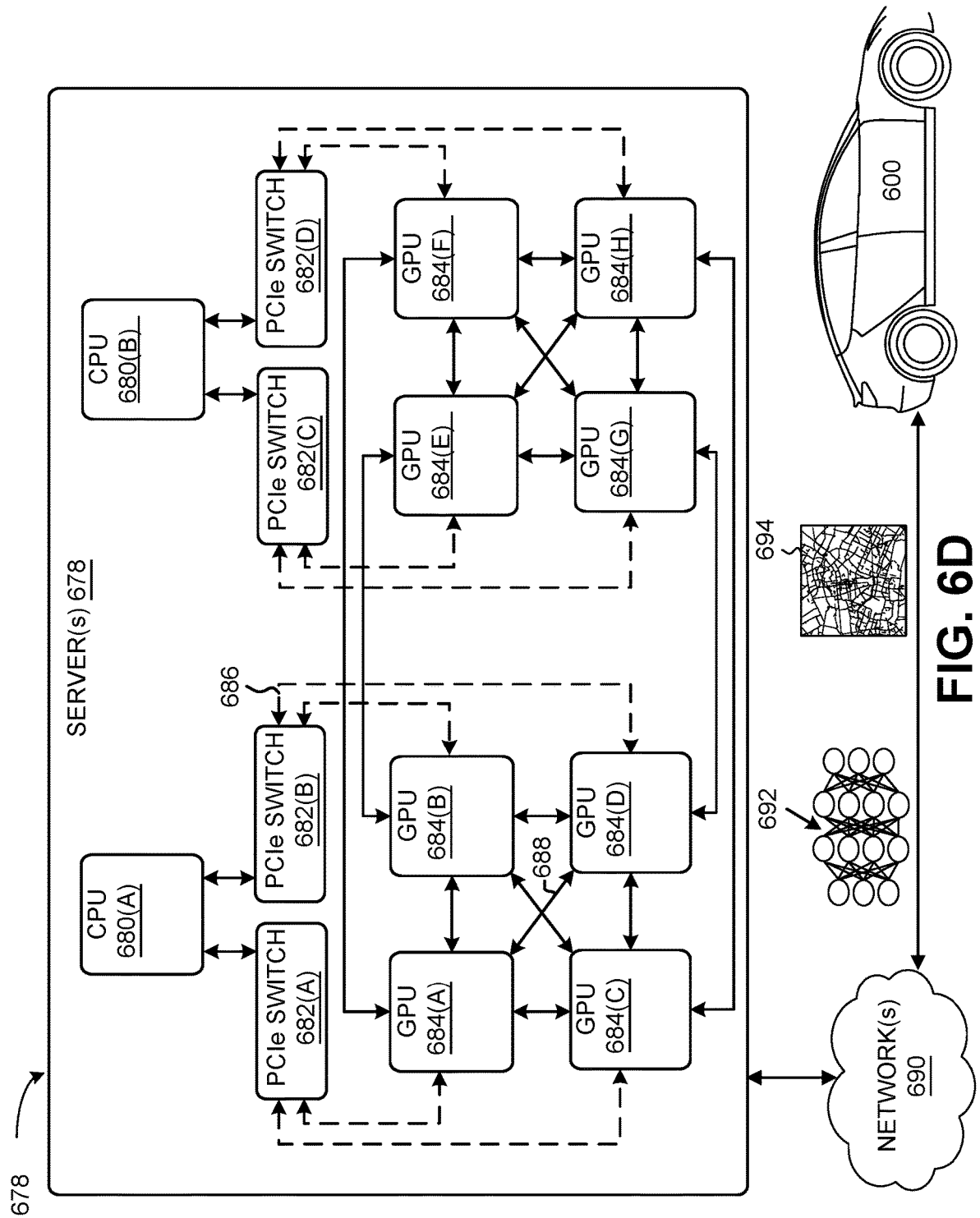

STAGGERED AUTHENTICATION FOR DATA TRANSFER

TECHNICAL FIELD

At least one embodiment pertains to processing resources and techniques that are used to improve efficiency and decrease latency of data transfers in computational applications. For example, at least one embodiment pertains to processing and authentication of image, video, and other sensor data types in safety-sensitive applications, such as autonomous or semi-autonomous driving applications.

BACKGROUND

In safety-sensitive applications, such as autonomous or semi-autonomous driving systems, large amounts of sensor data, e.g., camera data, light detection and ranging (LiDAR) data, radio detection and ranging (RADAR) data, ultrasonic data, sonar data, etc., have to be processed quickly and accurately. Government regulations and data security protocols often mandate that data collected by sensors in sensitive applications and transferred for data processing be authenticated (e.g., using cryptographic techniques) prior to being used in various applications. In streaming applications, for example, the volume of the cryptographically authenticated data (e.g., video images) is often quite significant.

BRIEF DESCRIPTION OF DRAWINGS

FIG. 2A illustrates sub-frame authentication in a situation of an uncorrelated selection of sub-frames for authentication, according to at least one embodiment; FIG. 2B illustrates sub-frame authentication using a staggered authentication schedule, according to at least one embodiment;

FIG. 6D is a diagram illustrating a system for communication between cloud-based server(s) and the autonomous vehicle of FIG. 6A, according to at least one embodiment;

DETAILED DESCRIPTION

Figure 1:
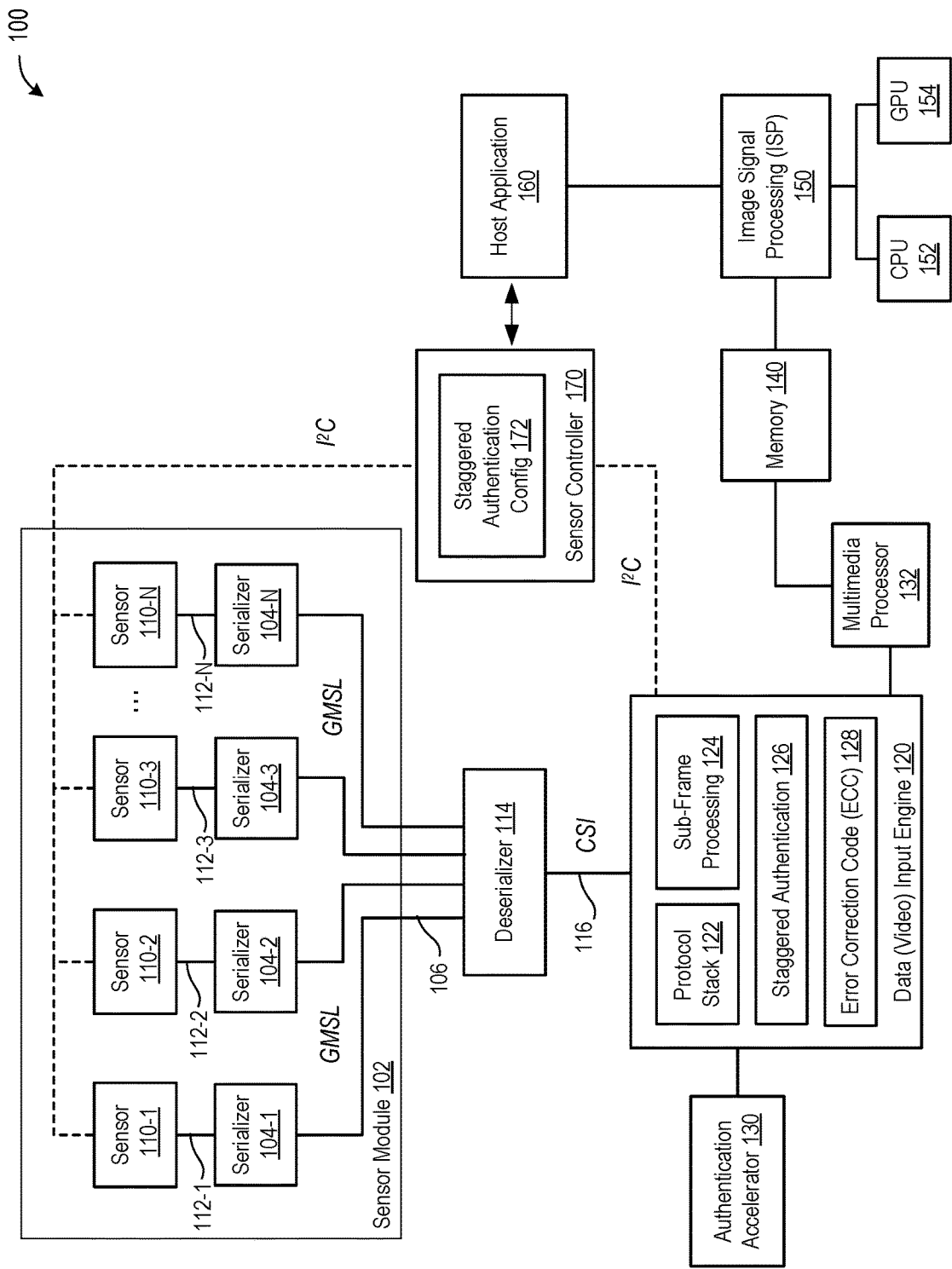
FIG. 1 is a block diagram of an example system capable of implementing staggered authentication of sensor data in real-time or near real-time streaming applications, according to at least one embodiment.

Authentication of data in streaming, or more generally data transfer applications—such as data generated using various sensors—is performed for multiple streams of data (e.g., video and image camera data). For example, multiple parallel channels of video data generated by a set of cameras of an autonomous or semi-autonomous machine or vehicle (a public or private security system, industrial monitoring system, etc.) may be serialized (e.g., using MIPI CSI-2 protocol) and transmitted to an image (e.g., video input) processor. The serial data may travel over a coaxial cable (e.g., GMSL link, FPD link, Ethernet link, etc.). Prior to processing by the image processor, the data may be deserialized back into the multiple channels (e.g., over another MIPI CSI-2 connection). The image processor may then convert the stream of raw pixel data into demosaiced images (frames) that are subsequently used by a consumer of the data, e.g., a host application, which may be a computer-vision application, an onboard entertainment application, a security application, and/or the like.

The data transmitted over such a path may sometimes become corrupted or altered by a malicious attacker. To prevent corrupted and/or altered data from being provided to the host application, the image processor can perform data authentication. For example, individual sensors can generate a message authentication code (MAC) after a certain unit of data, e.g., a frame, is produced. The MAC can be computed using a cryptographic key that is shared between a sensor and the image processor. The key may be an ephemeral key that is shared at the beginning of a session. For example, the image processor (or a sensor) may generate the ephemeral key, and encrypt the generated key using a public key of the sensor (or a public key of the image processor) and communicate the encrypted key to the sensor (or the image processor), where the key may be decrypted using a corresponding private key. When the image processor receives pixel data for a particular image frame, the image processor (or a dedicated accelerator) computes a verification MAC for the received frame using the ephemeral key and compares the verification MAC to the MAC received with the frame. A mismatch of the two MACs indicates that the data has been changed (e.g., because of an error or a malicious attack). The image processor may then discard the frame instead of providing it to the host application.

Since it is advantageous to synchronize collection of sensor data, multiple sensors are often configured to provide frames at the same time. In such a setup, multiple frames of data arrive for authentication concurrently. This creates a bottleneck and increases latency of data processing. To reduce the latency and speed up the processing, a portion of individual frames can be authenticated, e.g., a quarter of a frame containing a specific region of interest (ROI), as can be selected by an individual sensor. This reduces the time for frame authentication, but does not fully eliminate the bursts of authentication since different sensors may select, on many occasions, the same-numbered portions of the respective frames, which arrive for authentication processing at about the same time.

Aspects and embodiments of the instant disclosure address these and other technological challenges by disclosing methods and systems that eliminate or significantly reduce authentication bottlenecks in streaming and safety-sensitive applications. This diffuses bursts of processing, reduces latency, and improves efficiency of data communication. More specifically, the disclosed techniques include establishing a staggered authentication schedule for authentication of selected portions of frames (or any other units of data) generated by different sensors. For example, N sensors $S_1 \ldots S_N$ may generate frames with one 1/Nth portion (sub-frame) of a frame to be authenticated (and the rest N−1 portions unauthenticated). The order of authentication may be any permutation of $S_1 \ldots S_N$, denoted herein as $\mathscr{F}(S_1 \ldots S_N)$, in which individual sensors appear once. For example, a possible permutation of four sensors $S_1$, $S_2$, $S_3$, $S_4$ may be $S_2$, $S_4$, $S_3$, $S_1$, in which instance sensor $S_2$ is to place an authentication ROI in the first quarter of its frame, sensor $S_2$ is to place an authentication ROI in the second quarter of its frame, sensor $S_3$ is to place an authentication ROI in its frame, and sensor $S_1$ is to place an authentication ROI in its frame. Subsequent frames may be processed in the same order. As a result, authentication of data received from different sensors is spread evenly across the entire processing time and the authentication bottlenecks are eliminated.

In some embodiments, the order of sub-frame authentication may be determined by a sensor controller and communicated to sensors over a suitable communication channel, e.g., $I^2C$ link. In some embodiments, the sensor controller may, from time to time, change (shuffle) the order, e.g., at periodic time intervals or upon occurrence of a predetermined event. In some embodiments, the order of sub-frame authentication may be determined by individual sensors in an independent but correlated fashion. For example, individual sensors may use a pseudorandom number generator that generates a random shuffle of N consecutive numbers 1, 2, . . . N based on a seed number that is known to all sensors (e.g., communicated to the sensors by the sensor controller at the start of an operating session). Individual sensors may then select an assigned element from that list (e.g., sensor $S_j$ may select a jth number from each shuffle). Since multiple sensors generate the same random shuffle, each shuffle changes the order of the sub-frame authentication while maintaining the non-overlapping property. The shuffles may be performed synchronously by multiple sensors, e.g., periodically, responsive to passage of a certain time measured by a clock common to the sensors. In some embodiments, the number of sensors N may be very large so that splitting individual frames into N portions and authenticating just a single 1/Nth portion of a frame may be insufficient for reliable frame authentication. In such instances, the frames may be split into M portions with N/M portions (e.g., received from the respective number of sensors) being authenticated each time. In some embodiments, the sensors may be authenticating multiple portions, e.g., all M generated portions, while the image processor establishes a staggered authentication schedule (e.g., authenticating one portion for each sensor) without providing the sensors with the authentication schedule or even without informing the sensors about the existence of such schedule.

The advantages of the disclosed techniques include, but are not limited to, elimination or reduction of bursts in data authentication processing and reduction of latency in streaming, data transfer, and safety-sensitive applications.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implementing one or more language models, such as large language models (LLMs) (which may process text, voice, image, and/or other data types to generate outputs in one or more formats), systems implemented at least partially using cloud computing resources, and/or other types of systems.

System Architecture

FIG. 1 is a block diagram of an example system 100 capable of implementing staggered authentication of sensor data in real-time or near-real time streaming (or more generally, data transfer) applications, according to at least one embodiment. As depicted in FIG. 1, system 100 may include one or more sensor modules, e.g., sensor module 102 (for conciseness, one sensor module is shown). Sensor module may include multiple sensors, e.g., N sensors 110-1 . . . 110-N, e.g., N=2, 4, 5, 8, or any other number of sensors. Sensors 110-1 . . . 110-N may include camera sensors, radio detection and ranging (RADAR) sensors, light detection and ranging (LiDAR) sensors, sonar sensors, and the like Sensor(s) 110-*j* may generate sensor data in any suitable unprocessed or minimally processed (e.g., sensor-specific and/or proprietary) raw data format. In some embodiments, sensor data generated by sensor(s) 110-*j* may be collected periodically with some frequency f, which may correspond to a camera acquisition rate, LiDAR scanning frequency, and/or the like.

In some embodiments, sensor data may be a mosaiced pixel data obtained using a number of color filters. For example, in a Bayer filter, each group of four pixels in a 2×2 array (e.g., a Color Filter Array) may include two green pixels, one red pixel, and one blue pixel, e.g., such that the filter is made of alternating red and green pixels for odd rows and alternating green and blue pixels for even rows.

In some embodiments, sensors 110-*j* may provide data (e.g., a stream of raw mosaiced pixels) to an image processor module, which may include a deserializer 114 and a data input engine 120, e.g., a video input engine or an engine for processing of any other applicable data. In some embodiments, transfer of data between sensors 110-*j* and data input engine 120 may be performed according to one or more protocols developed by Mobile Industry Processor Interface (MIPI) alliance. In some embodiments, sensors 110-*j* may use a camera serial interface (CSI), e.g., MIPI CSI-1, MIPI CSI-2, MIPI CSI-3, and/or any other interface that implements a unidirectional or bidirectional data transfer. For example, individual sensors 110-$j$ may generate multiple channels of data, e.g., a red channel, one or more green channels, a blue channel, and the like. CSI protocol may serialize these multiple channels and stream the serialized data via a respective CSI data channel 111-$j$. Serializers 104-1 . . . 1042-N may then transform N parallel CSI data channels 111-$j$ into a single data channel 106, e.g., a Gigabit Multimedia Serial Link (GMSL), an FPD (Flat Panel Display) link, and/or the like. In some embodiments, sensor module 102 may include additional components not shown in FIG. 1, including but limited to one or more temperature sensors to detect ambient and/or sensor temperature, one or more heater elements to maintain a target sensor temperature of sensors 110-$j$, an electrically erasable programmable read-only memory (EEPROM), to store the raw pixel data generated by sensors 110-$j$, and other components and devices.

Serializers 104-$j$ may receive data (e.g., raw pixels) from sensors 110-$j$ and interleave the received data before transmitting the interleaved data via serial data channel 106. For example, serializer 104-$j$ may receive a stream of raw pixels $U_1^{(1)}, U_2^{(1)}, \ldots$ from sensor 110-1, a stream of raw pixels $U_1^{(2)}, U_2^{(2)}, \ldots$ from sensor 110-2, . . . , and a stream of raw pixels $U_1^{(N)}, U_2^{(N)}, \ldots$ from sensor 110-N. Herein, U indicates any unit of data associated with raw pixels, e.g., pixels corresponding to a full frame (or multiple frames), a portion of a frame (referred to as a sub-frame herein), a particular number of pixel lines, and so on. Serializers 104-$j$ may interleave the received units of data in any suitable manner, such as by first transmitting the first units of data from various sensors 110-$j$, followed the with second units of data from the same sensors, and so on, e.g., $$U_1^{(1)}, U_1^{(2)} \ldots U_1^{(N)}, U_2^{(1)}, U_2^{(2)} \ldots U_2^{(N)}, \ldots U_k^{(1)}, U_k^{(2)} \ldots U_k^{(N)} \ldots$$

Serial data channel 106 may deliver various serialized units of data $U_k^{(j)}$ to data input engine 120 via deserializer 114, which may convert (multiplex) the serial stream of units into separate streams of units of individual sensors and deliver the separate streams to data input engine 120 over a channel 116, e.g., a CSI stream.

Some, any, or all (e.g., one or more) units of data by respective sensors, e.g., units of data $U_k^{(j)}$ may be authenticated by sensors 110-$k$, which generated the respective units of data $U_k^{(j)}$. Authentication may include application of any suitable message authentication code (MAC), e.g., a hash-based authentication code. Computation of a MAC may include using a cryptographic key associated with sensor $U_k^{(j)}$. For example, a unit of data $U_k^{(j)}$ may be authenticated by applying a hash-based authentication function to the lines of raw pixels concatenated, XOR'ed, or otherwise combined with the cryptographic key. Authentication may include placing a ROI into the respective unit of data $U_k^{(j)}$. The computed MAC may be provided with (e.g., appended to) the respective unit of data. In some embodiments, some of the units of data generated by a given sensor may be authenticated while other units of data are not authenticated. For example, every Nth unit of data, e.g., $U_4^{(j)}, U_8^{(j)}, U_{12}^{(j)} \ldots$ , generated by sensor 110-$k$ may be authenticated while other units generated by the same sensor are not authenticated.

Data input engine 120 may include an input interface (not shown in FIG. 1), a protocol stack 122, and/or other components and modules. In some embodiments, data input engine 120 may use a multimedia processor 132 to process raw pixel data. Multimedia processor 132 may include a central processing unit(s) (CPU), a graphics processing unit(s) (GPU), a northbridge, a southbridge, and memory controller. In some embodiments, multimedia processor 132 may be a Tegra® NVIDIA chip or any other suitable processing device capable of processing sensor data and formatting the processed data into a format that can be understood by an image signal processing (ISP) 150. In some embodiments, some or all of deserializer 114, data input engine 120, multimedia processor 132, and a memory 140 may be implemented as a system-on-chip device, as separate chips on a common board, as separate devices connected via a CSI interface/cable, and/or the like.

The sensor data received from deserializer 114 may be processed by protocol stack 122, e.g., an MIPI CSI transfer protocol stack, which may include hardware components and/or firmware modules implementing a physical layer, a lane merger layer, a low-level protocol layer, a pixel-to-byte conversion layer, an application layer, and the like. In some embodiments, protocol stack 122 may support multiple selectable data transmission rates. In some embodiments, protocol stack 122 may support data fusion of sensing data collected from different sensors 110-$j$, e.g., fusing camera data with radar data, lidar data, and the like.

Sub-frame processing 124 may be capable of reconstructing individual frames from multiple units of data received by data input engine 120. More specifically, a single video frame $F_j$ generated by sensor 110-$j$ may be transmitted as multiple units of data, e.g., as four units of data, $F_j = \{U_1^{(j)}, U_2^{(j)}, U_3^{(j)}, U_4^{(j)}\}$. In some embodiments, a granularity of the units of data (e.g., the size of an individual unit $U_k^{(j)}$, the number of units associated with a single frame, and the like) may be set by sub-frame processing 124. In some embodiments, the granularity of the units of data may be set by a sensor controller 170 that programs sensors 110-$j$ and sub-frame processing 124. During data streaming, sub-frame processing 124 may identify units of data associated with a single frame and cause data input engine 120 to aggregate the identified units of data and process the aggregated units into a format that can be understood by ISP 150.

Staggered authentication module 126 may operate in conjunction with sub-frame processing 124 and perform efficient authentication of frames $F_j$, e.g., as disclosed in more detail below in conjunction with FIGS. 2-3. More specifically, staggered authentication may be performed by authenticating fewer units of data (sub-frames) than the full set of the units, $U_1^{(j)}, U_2^{(j)}, U_3^{(j)}, U_4^{(j)}$, e.g., one, two, etc., of the units. The specific units of data to be authenticated may be selected (e.g., by sensor controller 170 or staggered authentication module 126) according to a schedule that minimizes, or at least reduces, a number of units (generated by various sensors) that have to be authenticated at the same time. A given frame may be deemed authenticated if one or more sub-frames scheduled for authentication for that frame are positively authenticated, e.g., sub-frames that include one or more ROIs of the frame. Conversely, a frame may be deemed corrupted or compromised, if at least one of the sub-frames of the frame fails to authenticate, e.g., if verification MAC(s) computed for the respective sub-frame(s) is (are) different from the MAC(s) received with the sub-frame(s).

Staggered authentication 126 may be facilitated by an authentication accelerator 130, which may be any suitable co-processor, cryptographic accelerator, programmable logic, etc., capable of performing authentication of units of data, e.g., hash-based authentication. Authentication facilitated by the authentication accelerator 130 may be performed similarly to the computation of MACs by sensors 110-$j$, e.g., by applying the hash-based authentication function (e.g., the same authentication function that was used by sensor 110-*j*) to the lines of raw pixels in the units of data $U_k^{(j)}$, which may be concatenated, XOR'ed, or otherwise combined with the cryptographic key.

Data input engine 120 may further include other modules and components. For example, data input engine 120 may include an error correction code (ECC) 128 capable of correcting a certain number of errors in the sensor data (e.g., using checksums, parity symbols, etc.) that have occurred as a result of interference, power surges, during raw pixel transmission from sensors 110-*j* to data input engine 120, and/or for any other reason. In particular, ECC 128 may use redundant data that is streamed together with the sensor (pixel) data. In some embodiments, while staggered authentication 126 may be applied to those units of data that are known to be MAC-authenticated, the ECC 128 may be applied to all received units of data. ECC may include Reed-Solomon codes, Hamming codes, single error correction/double error detection codes, or any other suitable error correction codes.

Data received, error-corrected, and authenticated by data input engine 120 may be stored in memory 140 where the data may be accessed by image signal processing (ISP) 150. In some embodiments, data stored in memory 140 may be accessed by both ISP 150 and authentication accelerator 130. ISP 150 that may include a collection of software/ firmware executable codes, libraries, and various resources that are stored in main memory 104 and executed by a central processing unit (CPU) 152, graphics processing unit (GPU) 154, parallel processing unit (PPU), field-programmable gate array (FPGA), application-specific integrated circuit (ASIC), and/or any other processing device, or a combination thereof. In some embodiments, various serial tasks of ISP 150 may be executed by CPU 152 and various parallel tasks may be executed by GPU 154. In some embodiments, both serial tasks and parallel tasks of ISP 150 may be executed by CPU 152, by GPU 154, or by a combination of CPU 152 and GPU 154, and/or some other processing device. ISP 150 may perform any suitable image processing of the sensor data, which may include noise filtering, de-blurring/sharpening, contrast modification, color adjustment, image merging (e.g., merging multiple images obtained by separate narrow-view cameras), image cropping and/or downscaling, and other image pre-processing. In some embodiments, ISP 150 may combine images acquired with multiple exposures, such as Standard Dynamic Range (SDR) exposures (e.g., a short exposure, a long exposure, an extra-long exposure, etc.), to generate merged pixel values that form a High Dynamic Range (HDR) image. ISP 150 may generate demosaiced images based on raw sensor data. Demosaiced images may include pixels having one or more intensity values, e.g., black-and-white intensity values, RGB (red, green, blue) intensity values, CMYK (cyan, magenta, yellow, key) intensity values, or intensity values of any other color scheme. Generating images by ISP 150 may include data compressing. ISP 150 may generate images in any digital format, e.g., TIFF, PNG, GIF, JPEG, BMP, or any other format, including any suitable proprietary formats. Various formats and layouts of images may include pixel data represented in block-linear format, pitch-linear format, sub-sampled format, and the like. For example, the pixel data may be outputted in the YUV420 format, in which a Y-luma channel is combined with U- and V-chroma channels, with the chroma channels having a different resolution than the luma channel (e.g., one half of the resolution of the luma channel). Additionally, individual pixels may have different formats, including packed (or interleaved) pixels, planar pixels, semi-planar pixels, and the like, each format specifying a particular way in which pixel data is stored in memory. In some embodiments, ISP 150 may combine images of different types, e.g., augmenting camera images with radar or lidar sensor data (such as associating various points in the camera images with distance data). ISP 150 may produce individual images and/or a time series of related images (e.g., a stream of video frames).

Images (or any other data files) generated by ISP 150 may be used by one or more applications, including real-time data streaming and/or processing applications, e.g., host application 160. In some embodiments, host application 160 may include an autonomous driving application, a gaming application, a multimedia entertainment application, a security application, an industrial monitoring application, and/or any other application that uses live-streaming data.

In some embodiments, system 100 may include a sensor controller 170 that controls settings of sensors 110-1 . . . 110-N and/or data input engine 120. For example, sensor controller 170 may configure data input engine 120 to recognize N streams of data output by N sensors, a certain number of frames per second, a certain size (resolution) of the frames, color scheme (e.g., black-and-white, RGB color, CMYK color, etc.) of the frames, and the like. Sensor controller 170 may include a staggered authentication configuration module 172 that coordinates sub-frame authentication across multiple sensors 110-1 . . . 110-N. For example, staggered authentication configuration module 170 may establish a staggered authentication schedule that identifies specific portions of frames (sub-frames) generated by sensors 110-*j* that are to be authenticated and portions that may remain unauthenticated. In some embodiments, sensor controller 170 may perform configuration of sensors 110-*j* and/or data input engine by sending instructions over any suitable control path, e.g., using Inter-Integrated Circuit ($I^2C$) protocol, universal asynchronous receiver-transmitter (UART) protocol, serial peripheral interface (SPI), and/or any other suitable communication protocol. In some embodiments, sensor controller 170 may operate responsive to calls from host application 160, e.g., facilitated by a suitable application programming interface (API) mediating interaction between sensor controller 170 and host application 160.

Figure 2A:
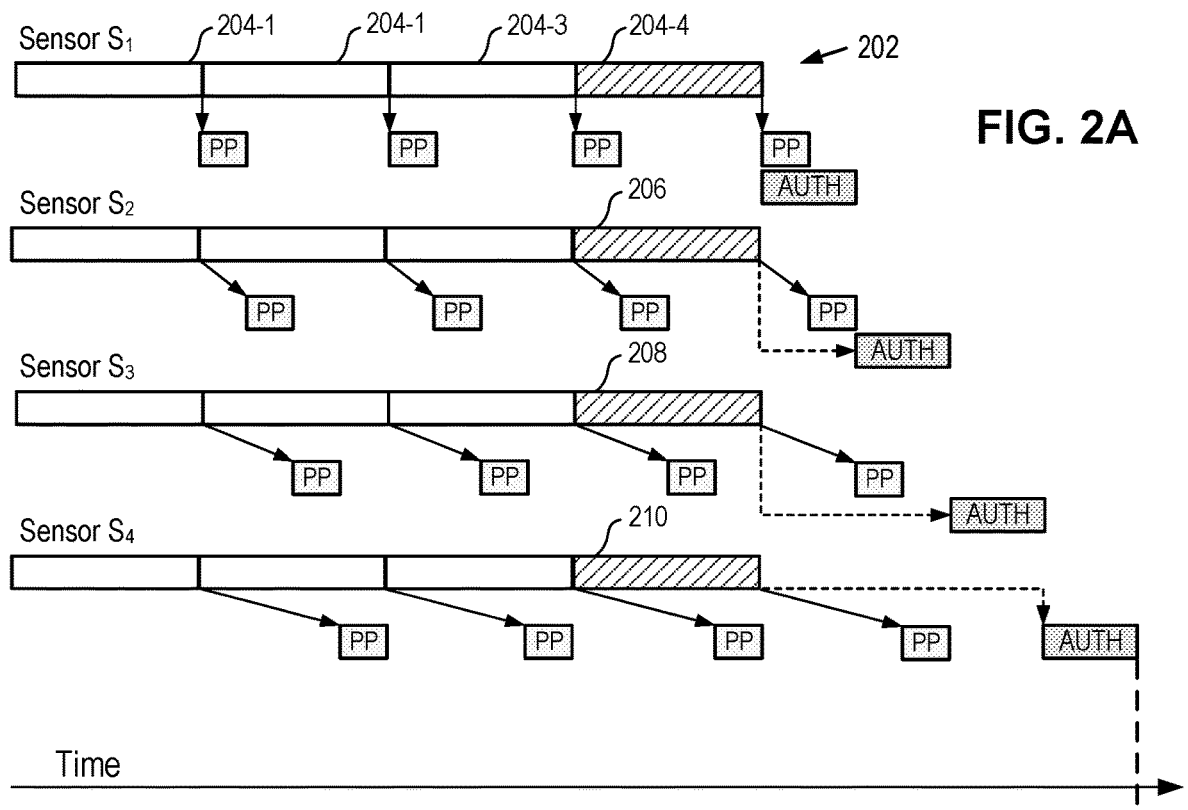
FIGS. 2A-2B depict schematic time diagrams illustrating sub-frame data authentication in, for example, live streaming and/or time-sensitive applications, according to at least one embodiment.
Figure 2B:
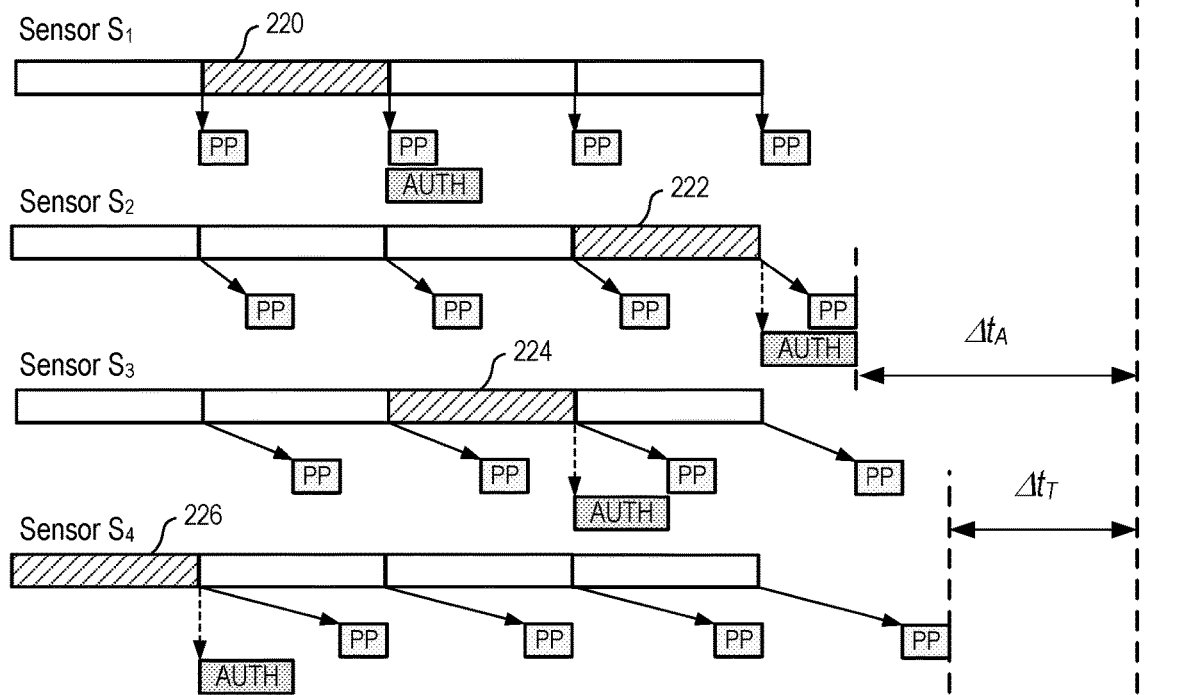
Figure 3:
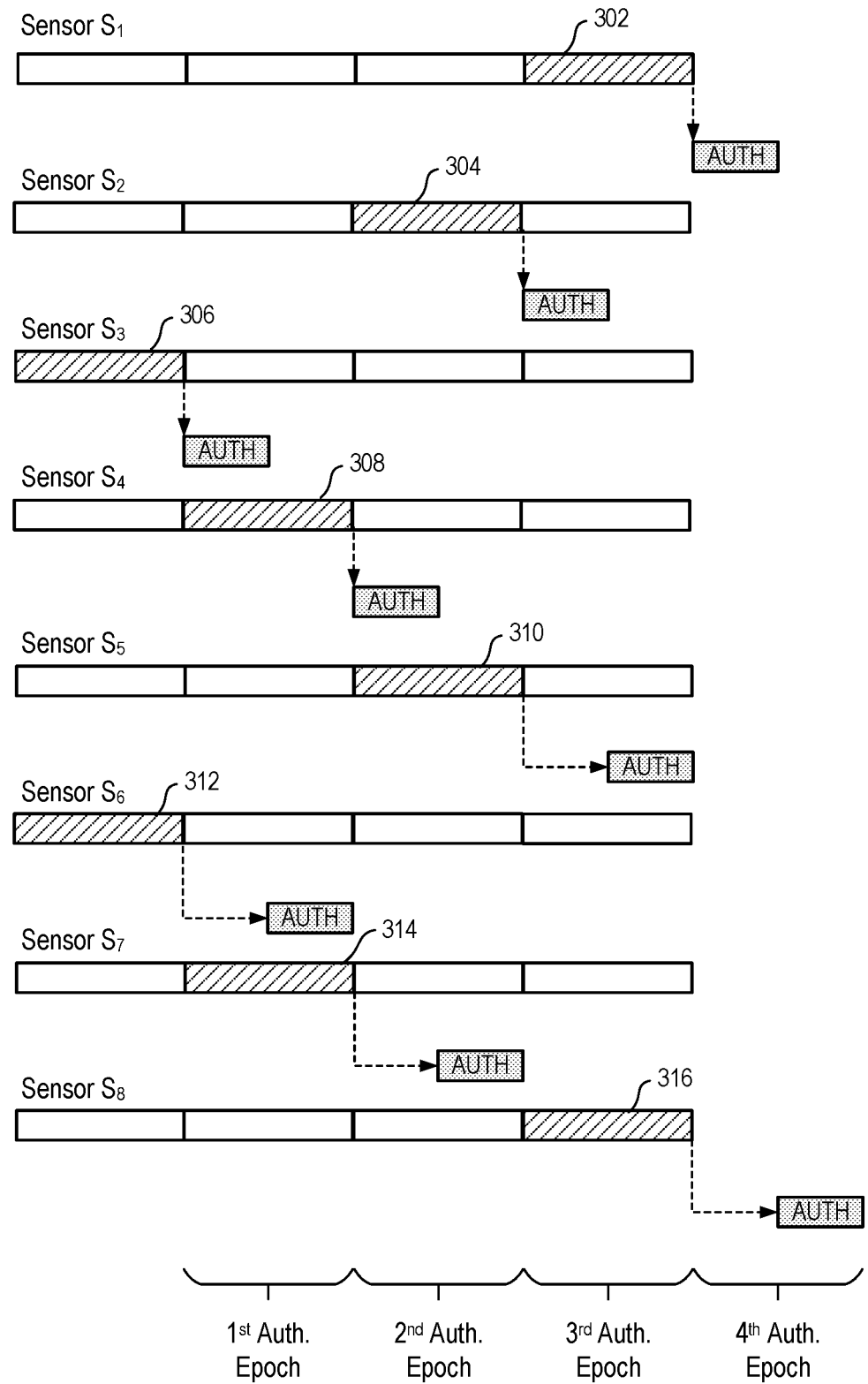
FIG. 3 illustrates sub-frame authentication using a staggered authentication schedule in instances of multiple sub-frames authenticated per authentication epoch, according to at least one embodiment.

FIGS. 2A-2B depict schematic time diagrams illustrating sub-frame data authentication in, for example and without limitation, live streaming and/or time-sensitive applications, according to at least one embodiment. Although reference throughout the description below may be made to frames, images, sub-frames, etc., it should be understood that similar embodiments may be used for authentication of any other types of streaming data. FIG. 2A illustrates sub-frame authentication in a situation of an uncorrelated selection of sub-frames for authentication. More specifically, FIG. 2A illustrates N=4 streams of data generated by the equal number of sensors (e.g., sensors 110-*j* of FIG. 1). A frame output by an individual sensor may include four sub-frames. A sensor may select a sub-frame for authentication (e.g., by placing a ROI in the corresponding sub-frame), as depicted with the cross-hatched bars, and compute a MAC (or any other authentication value) for the selected sub-frame. The sensor may leave other sub-units unauthenticated (e.g., by generating no MAC for other sub-units), e.g., as depicted with the white bars. For example, a frame 202 outputted by sensor $S_1$ may include four sub-frames 204-1 . . . 204-4 whose horizontal extent illustrates the duration of generation of raw pixel data and transmission of the respective frame from a corresponding sensor to the video input engine (e.g., data input engine 120).

As depicted in the example of FIG. 2A, sensor $S_1$ has selected the last sub-frame 204-4 for authentication (e.g., placed ROI in the last sub-frame 204-4) and kept sub-frames 204-1, 204-2, and 204-3 unauthenticated. Individual sub-frames 204-k may be received by the video input engine that performs pixel processing (PP) for each received sub-frame. Other sensors $S_2$-$S_4$ generate and provide respective frames that include four sub-frames, of which one sub-frame is authenticated. The data input engine may process the received sub-frames sequentially. In the example of FIG. 2A, the data input engine may first perform PP of the first sub-frames from individual frames, e.g., starting from sensor $S_1$ frame and finishing with sensor $S_4$ frame (although the order may be arbitrary and may change from frame to frame). Subsequently, the video input engine may perform PP of the second sub-frames from consecutive frames, similarly starting from sensor $S_1$ frame and finishing with sensor $S_4$ frame. The same process may be performed for the remaining sub-frames.

In those instances where the video input engine determines that a particular arriving sub-frame is authenticated, the data input engine may perform authentication of the corresponding sub-frame, e.g., using staggered authentication module 126 and/or authentication accelerator 130, as depicted with AUTH blocks indicating sub-frame authentication processing in FIGS. 2A-2B. In some embodiments, the video input engine may determine that the sub-frame is authenticated based on the authentication schedule set by staggered authentication configuration module 172. In some embodiments, the video input engine may determine that the sub-frame is authenticated using metadata provided with the sub-frame, e.g., using an authentication flag or indicator provided with the sub-frame from the sensor that generated that sub-frame.

In those instances where multiple authenticated sub-frames arrive together (authentication collision), the authentication accelerator may authenticate such sub-frames sequentially, e.g., a first arrived sub-frame may be authenticated first while the second (third, etc.) sub-frame is awaiting authentication. This adds to the latency of data processing. A situation that results in the maximum latency includes an authentication collision of N sub-frames. For example, as illustrated in FIG. 2A, the last sub-frames 204-4, 206, 208, and 210 generated by sensors 1-4, respectively, collide. As a result, sub-frame 204-4 is authenticated first while sub-frames 206, 208, and 210 await authentication, sub-frame 206 is authenticated next, and so on.

FIG. 2B illustrates sub-frame authentication using a staggered authentication schedule, according to at least one embodiment. More specifically, the staggered authentication schedule (e.g., established by staggered authentication configuration module 172) for sensors $S_1$-$S_4$ may eliminate collisions by ensuring that authenticated sub-frames correspond to different portions of the frames and, therefore, arrive for authentication (e.g., by authentication accelerator 130) at different times. This spreads authentication workload uniformly across the full processing time. For example, as illustrated in FIG. 2B, sensor $S_1$ authenticates the second sub-frame 220, sensor $S_2$ authenticates the fourth sub-frame 222, sensor $S_3$ authenticates the third sub-frame 224, and sensor $S_4$ authenticates the second sub-frame 220. As a result, authentication of all frames is completed a time $\Delta t_A$ prior to completion of authentication in the example of FIG. 2A and the total processing time (including pixel processing) is $\Delta t_T$ shorter than in the example of FIG. 2A.

Similar staggered authentication may be implemented for any number N of sensors. For example, each of N sensors $S_1 \ldots S_N$ may generate a frame of which one 1/Nth sub-frame is authenticated and the remaining N−1 sub-frames are unauthenticated. The order of authentication may be any permutation $\mathcal{P}(S_1 \ldots S_N)$ of the sequence $S_1 \ldots S_N$, in which individual sensors $S_j$ appear once. The total number of possible permutations is given by the factorial of the number of the sub-frames (e.g., N!). This spreads authentication of sub-frames received from different sensors evenly across the processing time efficiently eliminating authentication bursts (like the one illustrated in FIG. 2A).

The order of sub-frame authentication (e.g., a specific permutation $\mathcal{P}(S_1 \ldots S_N)$ used) may be determined by sensor controller 170 (e.g., by staggered authentication configuration module 172) and communicated to sensors $S_1 \ldots S_N$ over a control path, e.g., a I²C link. In some embodiments, sensor controller 170 may establish a first authentication schedule at a time of sensor initialization (or at initialization of host application 160). Subsequently, sensor controller 170 may shuffle the authentication schedule at periodic time intervals or upon an occurrence of a predetermined event, such as the detection that a predetermined number of frames (or sub-frames) fails to authenticate. Shuffling may be performed by a random number generator generating a random sequence of N numbers 1, 2, . . . N.

In some embodiments, the order of sub-frame authentication may be determined by individual sensors $S_1 \ldots S_N$ using a pseudorandom number generator that generates a random shuffle of N numbers 1, 2, . . . . N based on a seed number that is known to multiple sensors, e.g., as communicated to the sensors by the sensor controller 170 at sensor initialization. In some embodiments, the seed number may be encrypted with a secret key and communicated over the I²C link. During initialization, individual sensors may generate a first pseudorandom sequence of N numbers 1, 2, . . . . N using the (decrypted) seed, with different sensors generating the same pseudorandom sequence (which remains secret and not available to unauthorized parties). Individual sensors may then select an element from the list based on a pre-assigned order, e.g., sensor S; may select a jth element from the pseudorandom sequence. The jth element may then be stored in a memory buffer of the respective sensor as an authentication index for the sensor. During run-time, e.g., at predetermined periodic times measured by a clock common to the sensors (or responsive to a reshuffle ping received from sensor controller 170), the sensor may generate a new pseudorandom sequence and overwrite the authentication index with a new value.

In some embodiments, the number of sensors N may be so large that splitting individual frames into N sub-frames and authenticating a single 1/Nth sub-frame may be insufficient for reliable frame authentication. In such instances, the frames may be split into M sub-frames with N/M sub-frames (e.g., received from the respective number of sensors) being authenticated during each authentication epoch. FIG. 3 illustrates sub-frame authentication using a staggered authentication schedule in instances of multiple sub-frames authenticated per authentication epoch, according to at least one embodiment. Shown is an example embodiment of N=8 sensors generating M=4 sub-frames per frame and an illustrative staggered authentication schedule in which N/M=2 sub-frames are authenticated during each of the M authentication epochs. In particular, authentication accelerator may authenticate:

- during the first authentication epoch, a sub-frame 306 generated by sensor $S_3$ and a sub-frame 312 generated by sensor $S_6$;
- during the second authentication epoch, a sub-frame 308 generated by sensor $S_4$ and a sub-frame 312 generated by sensor $S_7$;
- during the third authentication epoch, a sub-frame 304 generated by sensor $S_2$ and a sub-frame 310 generated by sensor $S_5$; and
- during the fourth authentication epoch, a sub-frame 302 generated by sensor $S_1$ and a sub-frame 316 generated by sensor $S_8$.

The authentication schedule may be established and/or updated using any of the techniques disclosed in conjunction with FIGS. 2A-2B.

In some embodiments, sensors 110-j may be unaware which portion(s) are to be authenticated by the video input engine and the authentication accelerator. More specifically, staggered authentication configuration module 172 may establish a staggered authentication schedule but not provide the schedule to sensors 110-j. During sensing operations, sensors 110-j may authenticating multiple portions, e.g., all generated portions whereas the video input engine authenticates one (or M) of portions per frame based on the authentication schedule.

Figure 4:
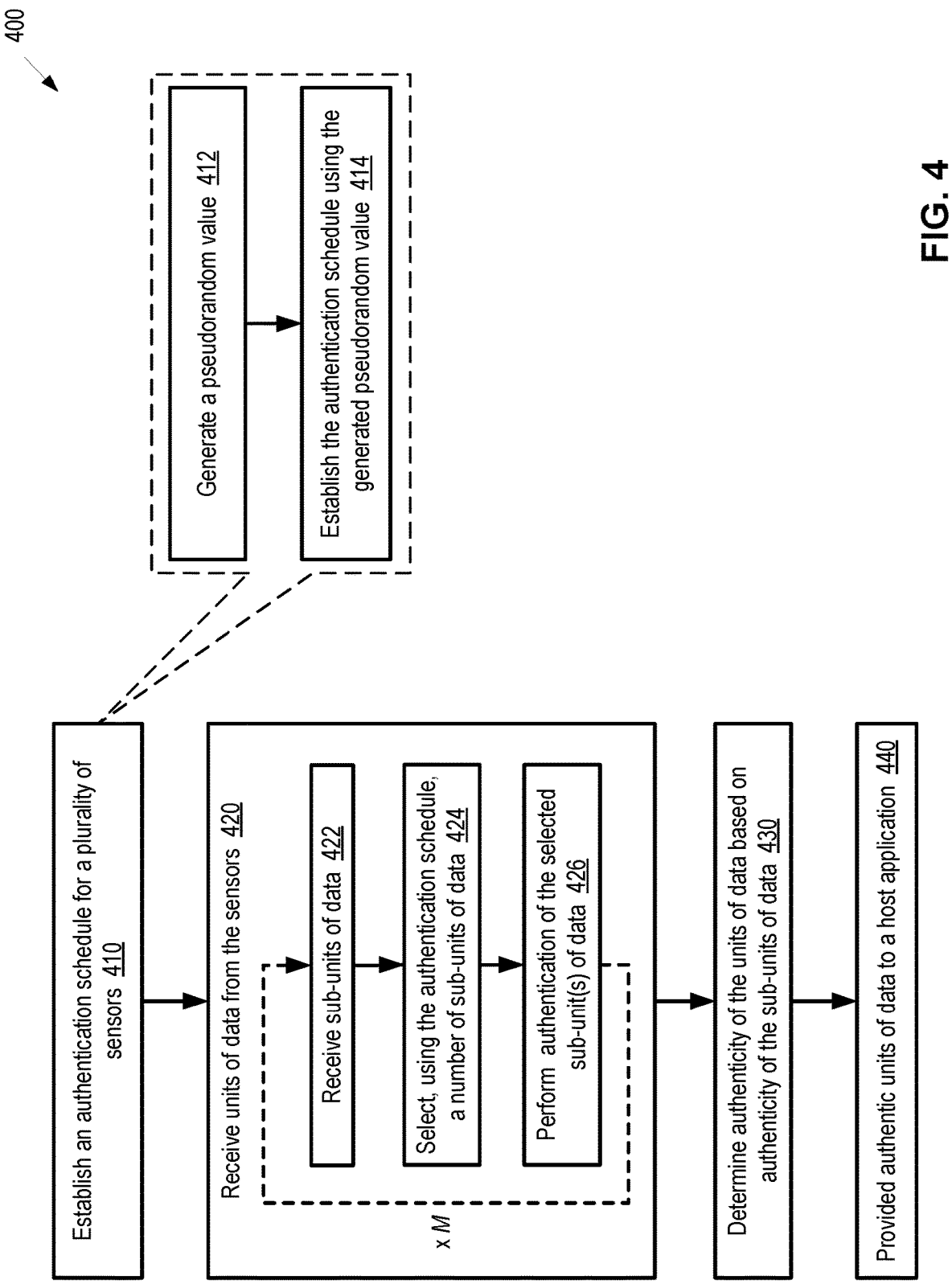
FIG. 4 is a flow diagram of an example method of sub-unit data authentication in live streaming and/or time-sensitive applications, as may be performed by a data processing device, according to at least one embodiment.
Figure 5:
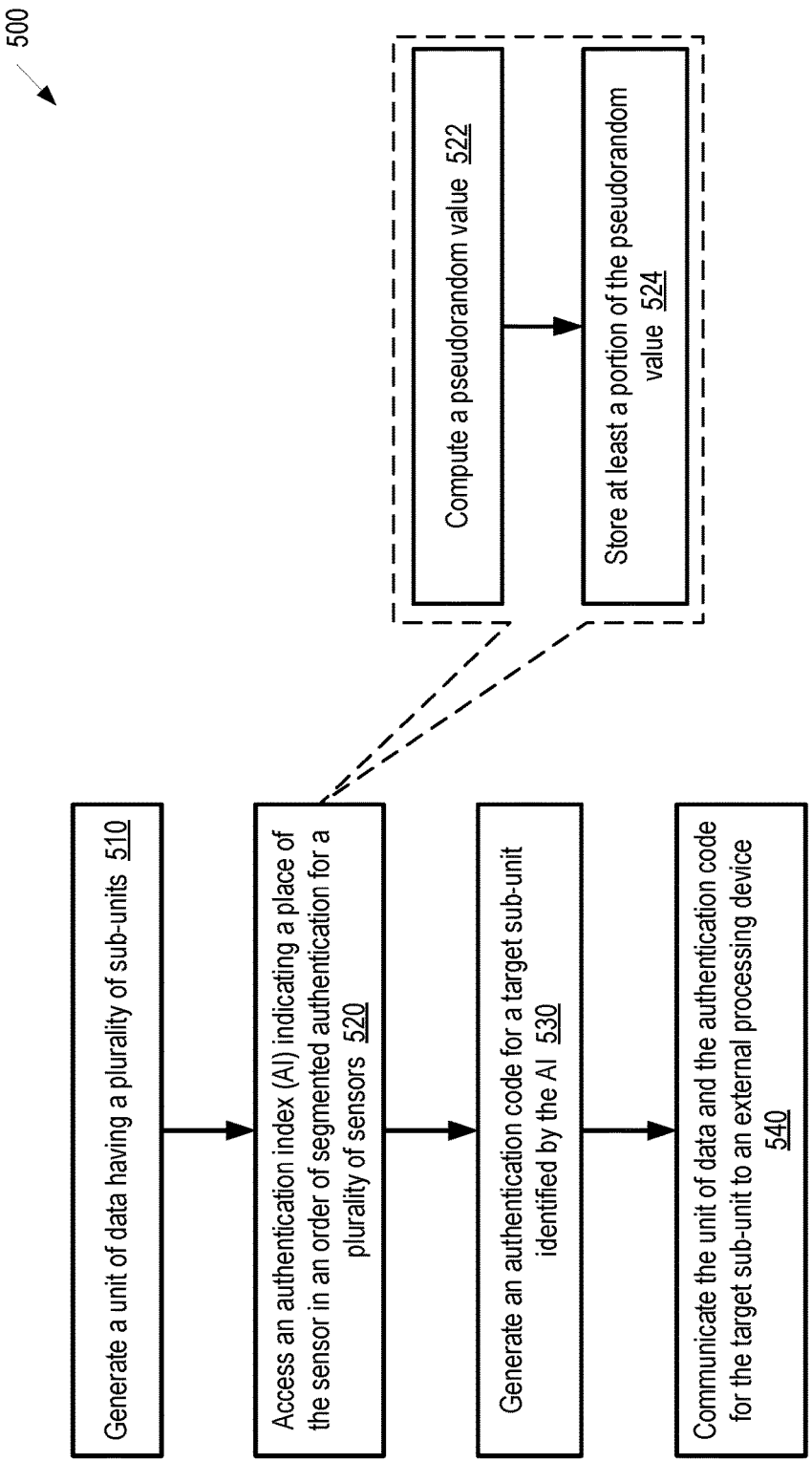
FIG. 5 is a flow diagram of an example method of efficient sub-unit data authentication in live streaming and/or time-sensitive applications, as may be performed by a sensing device, according to at least one embodiment.

FIGS. 4-5 are flow diagrams of example methods 400 and 500 of staggered sub-unit data authentication in, for example, live streaming and/or time-sensitive applications, according to some embodiments of the present disclosure. Methods 400 and 500 may be performed in the context of autonomous driving applications, industrial control applications, provisioning of streaming services, video monitoring services, computer-vision based services, artificial intelligence and machine learning services, mapping services, gaming services, virtual reality or augmented reality services, and many other contexts, and/or in systems and applications for providing one or more of the aforementioned services. Methods 400-500 may be performed using one or more processing units (e.g., CPUs, GPUs, accelerators, PPUs, DPUs, etc.), which may include (or communicate with) one or more memory devices. In at least one embodiment, methods 400 and 500 may be performed using sensor module 102, data input engine 120, and/or sensor controller 170 of FIG. 1. In at least one embodiment, processing units performing any of methods 400 and 500 may be executing instructions stored on a non-transient computer-readable storage media. In at least one embodiment, any of methods 400 and 500 may be performed using multiple processing threads (e.g., CPU threads and/or GPU threads), individual threads executing one or more individual functions, routines, subroutines, or operations of the method. In at least one embodiment, processing threads implementing any of methods 400 and 500 may be synchronized (e.g., using semaphores, critical sections, and/or other thread synchronization mechanisms). Alternatively, processing threads implementing any of methods 400 and 500 may be executed asynchronously with respect to each other. Various operations of any of methods 400 and 500 may be performed in a different order compared with the order shown in FIGS. 4-5. Some operations of any of methods 400 and 500 may be performed concurrently with other operations. In at least one embodiment, one or more operations shown in FIGS. 4-5 may not always be performed.

FIG. 4 is a flow diagram of an example method 400 of sub-unit data authentication in live streaming and/or time-sensitive applications, as may be performed by an image processing device, according to at least one embodiment. At block 410, method 400 may include establishing an authentication schedule for a plurality of sensors, e.g., as described in conjunction with FIG. 2 and/or FIG. 3. For example, the authentication schedule may specify the sub-units (portions) of units of data generated by individual sensors that are to be authenticated and/or the sub-units that are to remain unauthenticated. In some embodiments, the authentication schedule may be established during initialization of the plurality of sensors and/or a host application and modified at least once during a continuous operation of the plurality of sensors. In some embodiments, establishing the authentication schedule for the plurality of sensors may include operations illustrated in the callout portion of FIG. 4. More specifically, at block 412, method 400 may include generating a pseudorandom value (or multiple pseudorandom values) and using the generated pseudorandom value(s) to establish the authentication schedule and/or to modify the authentication schedule established previously.

At block 420, method 400 may continue with receiving a plurality of units of data from the plurality of sensors over a plurality of times. In some embodiments, a unit of the plurality of units of data may include an image frame. In some embodiments, the plurality of units of data may be received from the plurality of sensors via one or more of a MIPI CSI communication link, a GMSL link, or an FPD link. In some embodiments, receiving the plurality of units of data may be performed as illustrated with blocks 422-426 executed for each of the plurality of times. More specifically, at block 422, method 400 may include receiving a plurality of sub-units of data. Individual sub-units of data may be received from respective sensors of the plurality of sensors, e.g., one sub-unit of data may be received from one sensor for each of the plurality of times. At block 424, a processing device performing method 400 may select, using the authentication schedule, a predetermined number of one or more sub-units of data from the plurality of received sub-units of data. In some embodiments, the predetermined number may be one. In some embodiments, e.g., as described in conjunction with FIG. 3, the predetermined number may be N M, where the plurality of sensors may include N sensors, and an individual unit of data may include M sub-units of data. In some embodiments, N may be equal to M. In some embodiments, N may be different from M At block 426, method 400 may continue with the processing device performing an authentication of the selected one or more sub-units of data. In some embodiments, to perform the authentication of the selected sub-units of data, the processing device may compute one or more authentication values using at least one cryptographic key associated with at least one sensor of the plurality of sensors. For example, authentication values for sub-units of data generated by jth sensor may be computed using a cryptographic key associated with that jth sensor. The cryptographic key may be shared between jth sensor and an external processing device, e.g., the processing device that performs method 400. In some embodiments multiple (e.g., some or all) sensors may be using the same cryptographic key. In some embodiments, each sensor may be using a different cryptographic key unknown to other sensors.

At block 430, method 400 may include determining authenticity of the plurality of units of data using the performed authentications of the sub-units of data. For example, if one sub-unit of a unit of data fails to authenticate, the whole unit of data may be determined unauthentic, e.g., corrupted. At block 440, method 400 may include providing at least some of the units of data to a host application, e.g., responsive to the one or more units of data being determined authentic. In some embodiments, the sensors may be agnostic about the authentication schedule (e.g., the image processing device does not communicate the schedule to the sensors). In some embodiments, wherein the predetermined number is less than a number of authenticated sub-units of data received from the plurality of sensors, e.g., individual sensors may be authenticating M (e.g., all) sub-units of data for each unit of data, and the image processing device is authenticating one, two, and so on, of the M sub-units of data, according to the schedule that is established by and known to the image processing device.

FIG. 5 is a flow diagram of an example method 500 of efficient sub-unit data authentication in live streaming and/or time-sensitive applications, as may be performed by a sensing device, according to at least one embodiment. The sensing device may include a camera or any other suitable sensor, or a combination of sensors (e.g., a camera and a microphone). At block 510, method 500 may include generating a unit of data. At block 520, method 500 may continue with accessing a memory device (e.g., a buffer of the sensor) that stores an authentication index (AI). The AI may indicate a place of the sensor in an order of segmented authentication established for a stream of data generated by a plurality of sensors. The plurality of sensors may include the sensor and the stream of data may include the unit of data. For example, the sensor performing method 500 may be a jth sensor of the plurality of N sensors. In some embodiments, e.g., where the sensor includes a camera, the unit of data may be or include an image frame. In some embodiments, the unit of data may include N portions and the AI may indicate that the place of jth sensor in the order of segmented authentication of the stream of data is n, such that the jth sensor authenticates a target portion (sub-unit) that is nth chronological portion of the N portions (sub-units) of the unit of data.

In some embodiments, the sensor may receive the AI from a host device. In some embodiments, the AI may determine the AI as illustrated in the callout portion of FIG. 5. More specifically, at block 522 a processing device of the sensor may compute a pseudorandom value. At block 524, the sensor may store at least a portion of the pseudorandom value in the memory device, e.g., the portion of the pseudorandom value that represents the AI for that sensor.

At block 530, the processing device of the sensor may generate an authentication code for a target portion of the unit of data identified by the AI. In some embodiments, the authentication code may be generated using a cryptographic key associated with the sensor. In some embodiments, the cryptographic key may be shared between a sensor and the image processor. In some embodiments, the key may be an ephemeral key that is shared at the beginning of a session. For example, a data input engine (or a sensor) may generate the ephemeral key, and encrypt the generated key using a public key of the sensor (or a public key of the data input engine) and communicate the encrypted key to the sensor (or the data input engine), where the key may be decrypted using a private key of the sensor (or the data input engine). In some embodiments, the processing device of the sensor does not authenticate one or more of the N portions of the unit of data. For example, the processing device of the sensor may authenticate one portion of N portions of the unit of data and not authenticate N–1 portion of the unit of data. At block 540, method 500 may include communicating the unit of data and the authentication code for the target portion of the unit of data to a host processing device (e.g., data input engine 120 of FIG. 1). Communication of the unit of data may be performed by the host processing device using an MIPI CSI protocol, or any other suitable protocol.

Autonomous Vehicle

Figure 6A:
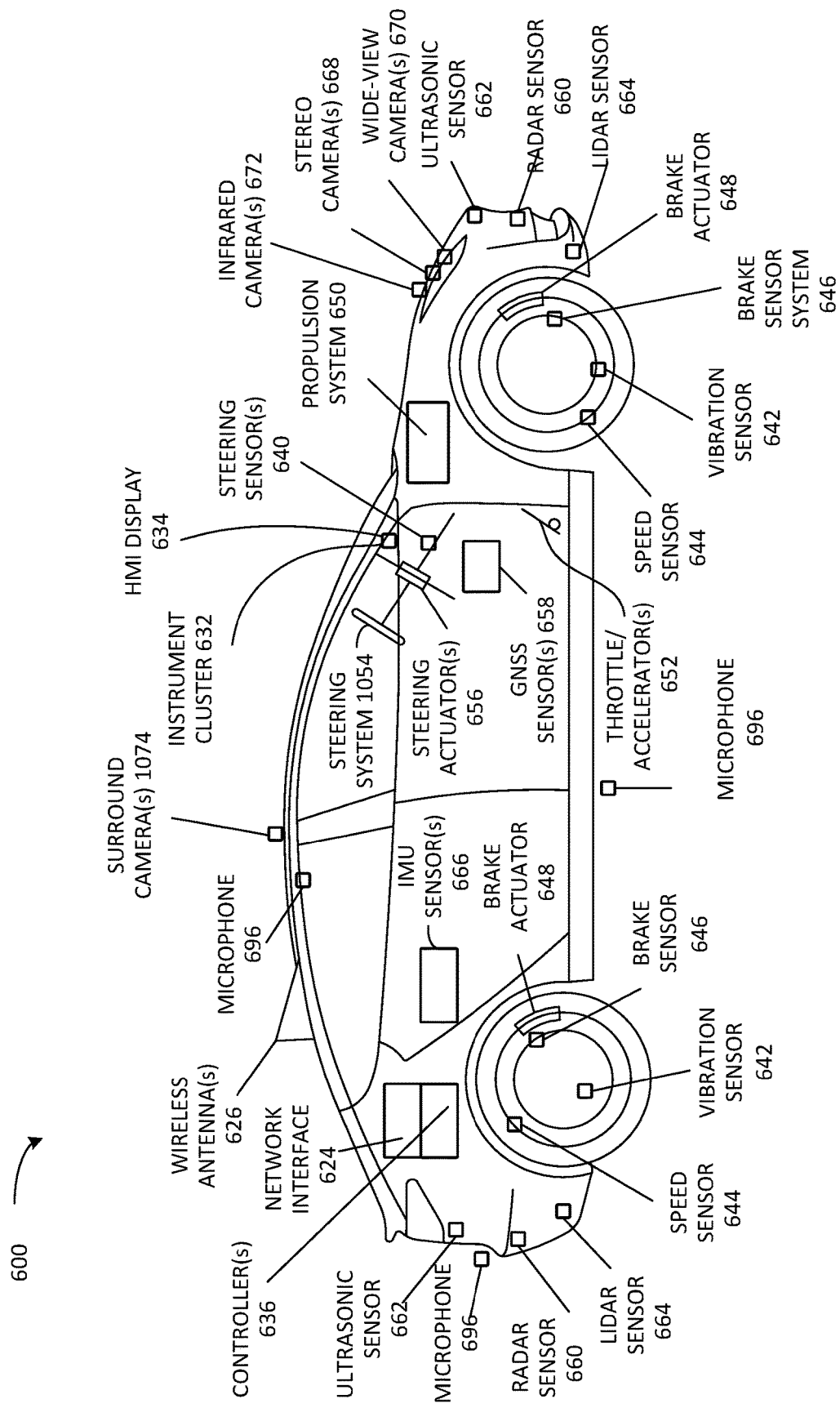
FIG. 6A illustrates an example of an autonomous vehicle, according to at least one embodiment.

FIG. 6A illustrates an example of an autonomous vehicle 600, according to at least one embodiment. In at least one embodiment, autonomous vehicle 600 (alternatively referred to herein as "vehicle 600") may be, without limitation, a passenger vehicle, such as a car, a truck, a bus, and/or another type of vehicle that accommodates one or more passengers. In at least one embodiment, vehicle 600 may be a semi-tractor-trailer truck used for hauling cargo. In at least one embodiment, vehicle 600 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In at least one embodiment, vehicle 600 may be capable of functionality in accordance with one or more of Level 1 through Level 5 of autonomous driving levels. For example, in at least one embodiment, vehicle 600 may be capable of conditional automation (Level 3), high automation (Level 4), and/or full automation (Level 5), depending on embodiment.

In at least one embodiment, vehicle 600 may include, without limitation, components such as a chassis, a vehicle body, wheels (e.g., 2, 4, 6, 8, 18, etc.), tires, axles, and other components of a vehicle. In at least one embodiment, vehicle 600 may include, without limitation, a propulsion system 650, such as an internal combustion engine, hybrid electric power plant, an all-electric engine, and/or another propulsion system type. In at least one embodiment, propulsion system 650 may be connected to a drive train of vehicle 600, which may include, without limitation, a transmission, to enable propulsion of vehicle 600. In at least one embodiment, propulsion system 650 may be controlled in response to receiving signals from a throttle/accelerator(s) 652.

In at least one embodiment, a steering system 654, which may include, without limitation, a steering wheel, is used to steer vehicle 600 (e.g., along a desired path or route) when propulsion system 650 is operating (e.g., when vehicle 600 is in motion). In at least one embodiment, steering system 654 may receive signals from steering actuator(s) 656. In at least one embodiment, a steering wheel may be optional for full automation (Level 5) functionality. In at least one embodiment, a brake sensor system 646 may be used to operate vehicle brakes in response to receiving signals from brake actuator(s) 648 and/or brake sensors.

In at least one embodiment, controller(s) 636, which may include, without limitation, one or more system on chips ("SoCs") (not shown in FIG. 6A) and/or graphics processing unit(s) ("GPU(s)"), provide signals (e.g., representative of commands) to one or more components and/or systems of vehicle 600. For instance, in at least one embodiment, controller(s) 636 may send signals to operate vehicle brakes via brake actuator(s) 648, to operate steering system 654 via steering actuator(s) 656, to operate propulsion system 650 via throttle/accelerator(s) 652. In at least one embodiment, controller(s) 636 may include one or more onboard (e.g., integrated) computing devices that process sensor signals, and output operation commands (e.g., signals representing commands) to enable autonomous driving and/or to assist a human driver in driving vehicle 600. In at least one embodiment, controller(s) 636 may include a first controller for autonomous driving functions, a second controller for functional safety functions, a third controller for artificial intelligence functionality (e.g., computer vision), a fourth controller for infotainment functionality, a fifth controller for redundancy in emergency conditions, and/or other controllers. In at least one embodiment, a single controller may handle two or more of above functionalities, two or more controllers may handle a single functionality, and/or any combination thereof.

In at least one embodiment, controller(s) 636 provide signals for controlling one or more components and/or systems of vehicle 600 in response to sensor data received from one or more sensors (e.g., sensor inputs). In at least one embodiment, sensor data may be received from, for example and without limitation, global navigation satellite systems ("GNSS") sensor(s) 658 (e.g., Global Positioning System sensor(s)), RADAR sensor(s) 660, ultrasonic sensor(s) 662, LIDAR sensor(s) 664, inertial measurement unit ("IMU") sensor(s) 666 (e.g., accelerometer(s), gyroscope(s), a magnetic compass or magnetic compasses, magnetometer(s), etc.), microphone(s) 696, stereo camera(s) 668, wide-view camera(s) 670 (e.g., fisheye cameras), infrared camera(s) 672, surround camera(s) 674 (e.g., 360 degree cameras), long-range cameras (not shown in FIG. 6A), mid-range camera(s) (not shown in FIG. 6A), speed sensor(s) 644 (e.g., for measuring speed of vehicle 600), vibration sensor(s) 642, steering sensor(s) 640, brake sensor(s) (e.g., as part of brake sensor system 646), and/or other sensor types.

In at least one embodiment, one or more of controller(s) 636 may receive inputs (e.g., represented by input data) from an instrument cluster 632 of vehicle 600 and provide outputs (e.g., represented by output data, display data, etc.) via a human-machine interface ("HMI") display 634, an audible annunciator, a loudspeaker, and/or via other components of vehicle 600. In at least one embodiment, outputs may include information such as vehicle velocity, speed, time, map data (e.g., a High Definition map (not shown in FIG. 6A), location data (e.g., vehicle's 600 location, such as on a map), direction, location of other vehicles (e.g., an occupancy grid), information about objects and status of objects as perceived by controller(s) 636, etc. For example, in at least one embodiment, HMI display 634 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 600 further includes a network interface 624 which may use wireless antenna(s) 626 and/or modem(s) to communicate over one or more networks. For example, in at least one embodiment, network interface 624 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000") networks, etc. In at least one embodiment, wireless antenna(s) 626 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc. protocols.

Figure 6B:
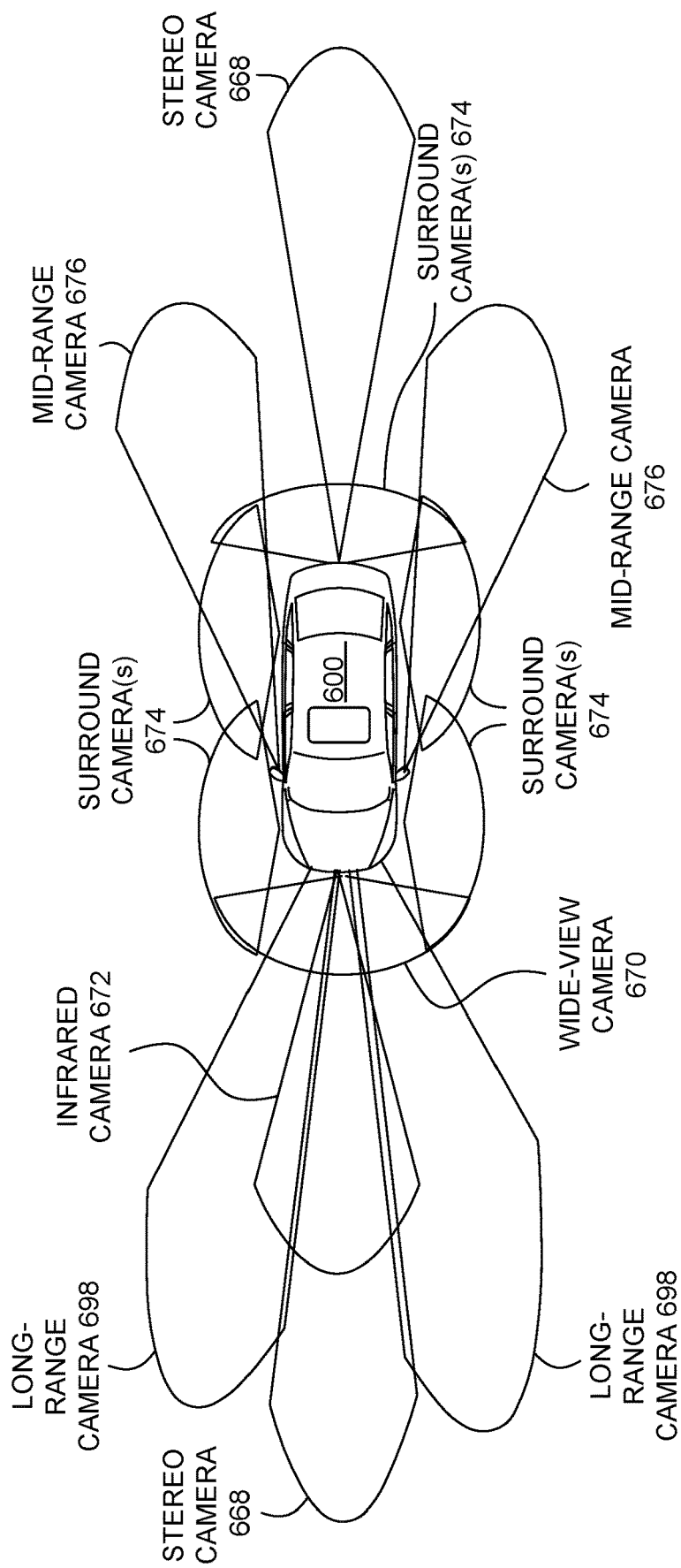
FIG. 6B illustrates an example of camera locations and fields of view for the autonomous vehicle of FIG. 6A, according to at least one embodiment.

FIG. 6B illustrates an example of camera locations and fields of view for autonomous vehicle 600 of FIG. 6A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 600.

In at least one embodiment, camera types for cameras may include, but are not limited to, digital cameras that may be adapted for use with components and/or systems of vehicle 600. In at least one embodiment, camera(s) may operate at automotive safety integrity level ("ASIL") B and/or at another ASIL. In at least one embodiment, camera types may be capable of any image capture rate, such as 60 frames per second (fps), 1220 fps, 240 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all cameras) may record and provide image data (e.g., video) simultaneously.

In at least one embodiment, one or more camera may be mounted in a mounting assembly, such as a custom designed (three-dimensional ("3D") printed) assembly, in order to cut out stray light and reflections from within vehicle 600 (e.g., reflections from dashboard reflected in windshield mirrors) which may interfere with camera image data capture abilities. With reference to wing-mirror mounting assemblies, in at least one embodiment, wing-mirror assemblies may be custom 3D printed so that a camera mounting plate matches a shape of a wing-mirror. In at least one embodiment, camera(s) may be integrated into wing-mirrors. In at least one embodiment, for side-view cameras, camera(s) may also be integrated within four pillars at each corner of a cabin.

In at least one embodiment, cameras with a field of view that include portions of an environment in front of vehicle 600 (e.g., front-facing cameras) may be used for surround view, to help identify forward facing paths and obstacles, as well as aid in, with help of one or more of controller(s) 636 and/or control SoCs, providing information critical to generating an occupancy grid and/or determining preferred vehicle paths. In at least one embodiment, front-facing cameras may be used to perform many similar ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, a wide-view camera 670 may be used to perceive objects coming into view from a periphery (e.g., pedestrians, crossing traffic or bicycles). Although only one wide-view camera 670 is illustrated in FIG. 6B, in other embodiments, there may be any number (including zero) wide-view cameras on vehicle 600. In at least one embodiment, any number of long-range camera(s) 698 (e.g., a long-view stereo camera pair) may be used for depth-based object detection, especially for objects for which a neural network has not yet been trained In at least one embodiment, long-range camera(s) 698 may also be used for object detection and classification, as well as basic object tracking.

In at least one embodiment, any number of stereo camera (s) 668 may also be included in a front-facing configuration. In at least one embodiment, one or more of stereo camera(s) 668 may include an integrated control unit comprising a scalable processing unit, which may provide a programmable logic ("FPGA") and a multi-core micro-processor with an integrated Controller Area Network ("CAN") or Ethernet interface on a single chip. In at least one embodiment, such a unit may be used to generate a 3D map of an environment of vehicle 600, including a distance estimate for all points in an image. In at least one embodiment, one or more of stereo camera(s) 668 may include, without limitation, compact stereo vision sensor(s) that may include, without limitation, two camera lenses (one each on left and right) and an image processing chip that may measure distance from vehicle 600 to target object and use generated information (e.g., metadata) to activate autonomous emergency braking and lane departure warning functions. In at least one embodiment, other types of stereo camera(s) 668 may be used in addition to, or alternatively from, those described herein.

In at least one embodiment, cameras with a field of view that include portions of environment to sides of vehicle 600 (e.g., side-view cameras) may be used for surround view, providing information used to create and update an occupancy grid, as well as to generate side impact collision warnings. For example, in at least one embodiment, surround camera(s) 674 (e.g., four surround cameras as illustrated in FIG. 6B) could be positioned on vehicle 600. In at least one embodiment, surround camera(s) 674 may include, without limitation, any number and combination of wide-view cameras, fisheye camera(s), 360 degree camera(s), and/or similar cameras. For instance, in at least one embodiment, four fisheye cameras may be positioned on a front, a rear, and sides of vehicle 600. In at least one embodiment, vehicle 600 may use three surround camera(s) 674 (e.g., left, right, and rear), and may leverage one or more other camera(s) (e.g., a forward-facing camera) as a fourth surround-view camera.

In at least one embodiment, cameras with a field of view that include portions of an environment behind vehicle 600 (e.g., rear-view cameras) may be used for parking assistance, surround view, rear collision warnings, and creating and updating an occupancy grid. In at least one embodiment, a wide variety of cameras may be used including, but not limited to, cameras that are also suitable as a front-facing camera(s) (e.g., long-range cameras 698 and/or mid-range camera(s) 676, stereo camera(s) 668), infrared camera(s) 672, etc.), as described herein.

Figure 6C:
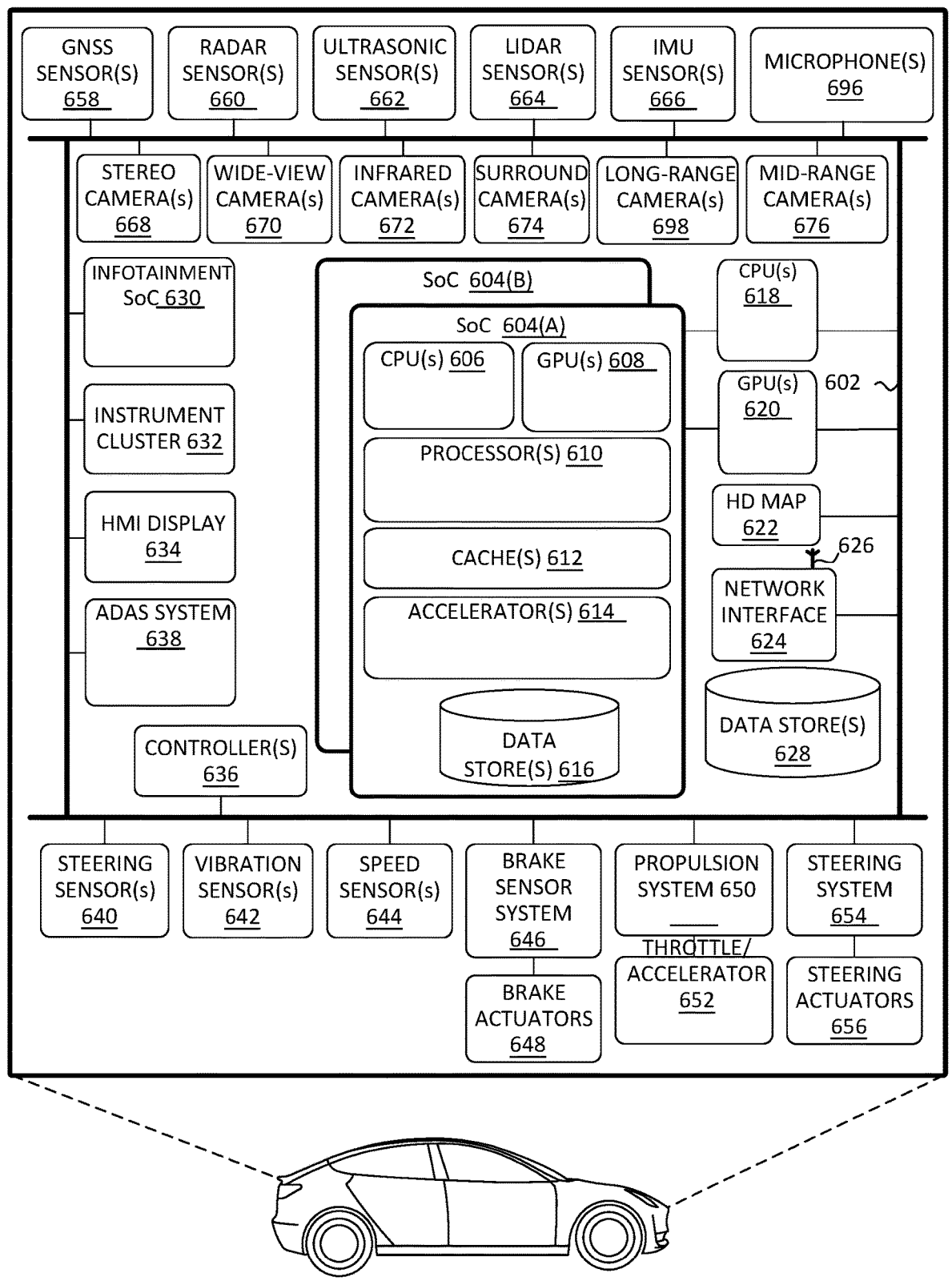
FIG. 6C is a block diagram illustrating an example system architecture for the autonomous vehicle of FIG. 6A, according to at least one embodiment.

FIG. 6C is a block diagram illustrating an example system architecture for autonomous vehicle 600 of FIG. 6A, according to at least one embodiment. In at least one embodiment, each of components, features, and systems of vehicle 600 in FIG. 6C is illustrated as being connected via a bus 602. In at least one embodiment, bus 602 may include, without limitation, a CAN data interface (alternatively referred to herein as a "CAN bus"). In at least one embodiment, a CAN may be a network inside vehicle 600 used to aid in control of various features and functionality of vehicle 600, such as actuation of brakes, acceleration, braking, steering, windshield wipers, etc. In at least one embodiment, bus 602 may be configured to have dozens or even hundreds of nodes, each with its own unique identifier (e.g., a CAN ID). In at least one embodiment, bus 602 may be read to find steering wheel angle, ground speed, engine revolutions per minute ("RPMs"), button positions, and/or other vehicle status indicators. In at least one embodiment, bus 602 may be a CAN bus that is ASIL B compliant.

In at least one embodiment, in addition to, or alternatively from CAN, FlexRay and/or Ethernet protocols may be used. In at least one embodiment, there may be any number of busses forming bus 602, which may include, without limitation, zero or more CAN busses, zero or more FlexRay busses, zero or more Ethernet busses, and/or zero or more other types of busses using different protocols. In at least one embodiment, two or more busses may be used to perform different functions, and/or may be used for redundancy. For example, a first bus may be used for collision avoidance functionality and a second bus may be used for actuation control. In at least one embodiment, each bus of bus 602 may communicate with any of components of vehicle 600, and two or more busses of bus 602 may communicate with corresponding components. In at least one embodiment, each of any number of system(s) on chip(s) ("SoC(s)") 604 (such as SoC 604(A) and SoC 604(B), each of controller(s) 636, and/or each computer within vehicle may have access to same input data (e.g., inputs from sensors of vehicle 600), and may be connected to a common bus, such CAN bus.

In at least one embodiment, vehicle 600 may include one or more controller(s) 636, such as those described herein with respect to FIG. 6A. In at least one embodiment, controller(s) 636 may be used for a variety of functions In at least one embodiment, controller(s) 636 may be coupled to any of various other components and systems of vehicle 600, and may be used for control of vehicle 600, artificial intelligence of vehicle 600, infotainment for vehicle 600, and/or other functions.

In at least one embodiment, vehicle 600 may include any number of SoCs 604. In at least one embodiment, each of SoCs 604 may include, without limitation, central processing units ("CPU(s)") 606, graphics processing units ("GPU(s)") 608, processor(s) 610, cache(s) 612, accelerator(s) 614, data store(s) 616, and/or other components and features not illustrated. In at least one embodiment, SoC(s) 604 may be used to control vehicle 600 in a variety of platforms and systems. For example, in at least one embodiment, SoC(s) 604 may be combined in a system (e.g., system of vehicle 600) with a High Definition ("HD") map 622 which may obtain map refreshes and/or updates via network interface 624 from one or more servers (not shown in FIG. 6C).

In at least one embodiment, CPU(s) 606 may include a CPU cluster or CPU complex (alternatively referred to herein as a "CCPLEX"). In at least one embodiment, CPU(s)

606 may include multiple cores and/or level two ("L2") caches. For instance, in at least one embodiment, CPU(s) 606 may include eight cores in a coherent multi-processor configuration. In at least one embodiment, CPU(s) 606 may include four dual-core clusters where each cluster has a dedicated L2 cache (e.g., a 2 megabyte (MB) L2 cache). In at least one embodiment, CPU(s) 606 (e.g., CCPLEX) may be configured to support simultaneous cluster operations enabling any combination of clusters of CPU(s) 606 to be active at any given time.

In at least one embodiment, one or more of CPU(s) 606 may implement power management capabilities that include, without limitation, one or more of following features: individual hardware blocks may be clock-gated automatically when idle to save dynamic power; each core clock may be gated when such core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 606 may further implement an enhanced algorithm for managing power states, where allowed power states and expected wakeup times are specified, and hardware/microcode determines which best power state to enter for core, cluster, and CCPLEX. In at least one embodiment, processing cores may support simplified power state entry sequences in software with work offloaded to microcode.

In at least one embodiment, GPU(s) 608 may include an integrated GPU (alternatively referred to herein as an "iGPU"). In at least one embodiment, GPU(s) 608 may be programmable and may be efficient for parallel workloads. In at least one embodiment, GPU(s) 608 may use an enhanced tensor instruction set. In at least one embodiment, GPU(s) 608 may include one or more streaming microprocessors, where each streaming microprocessor may include a level one ("L1") cache (e.g., an L1 cache with at least 96 KB storage capacity), and two or more streaming microprocessors may share an L2 cache (e.g., an L2 cache with a 512 KB storage capacity). In at least one embodiment, GPU(s) 608 may include at least eight streaming microprocessors. In at least one embodiment, GPU(s) 608 may use compute application programming interface(s) (API(s)). In at least one embodiment, GPU(s) 608 may use one or more parallel computing platforms and/or programming models (e.g., NVIDIA's CUDA model).

In at least one embodiment, one or more of GPU(s) 608 may be power-optimized for best performance in automotive and embedded use cases. For example, in at least one embodiment, GPU(s) 608 could be fabricated on Fin field-effect transistor ("FinFET") circuitry. In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA Tensor cores for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 608 may include a high bandwidth memory ("HBM") and/or a 16 GB high-bandwidth memory second generation ("HBM2") memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 608 may include unified memory technology. In at least one embodiment, address translation services ("ATS") support may be used to allow GPU(s) 608 to access CPU(s) 606 page tables directly. In at least one embodiment, embodiment, when a GPU of GPU(s) 608 memory management unit ("MMU") experiences a miss, an address translation request may be transmitted to CPU(s) 606. In response, 2 CPU of CPU(s) 606 may look in its page tables for a virtual-to-physical mapping for an address and transmit translation back to GPU(s) 608, in at least one embodiment. In at least one embodiment, unified memory technology may allow a single unified virtual address space for memory of both CPU(s) 606 and GPU(s) 608, thereby simplifying GPU(s) 608 programming and porting of applications to GPU(s) 608.

In at least one embodiment, GPU(s) 608 may include any number of access counters that may keep track of frequency of access of GPU(s) 608 to memory of other processors. In at least one embodiment, access counter(s) may help ensure that memory pages are moved to physical memory of a processor that is accessing pages most frequently, thereby improving efficiency for memory ranges shared between processors.

In at least one embodiment, one or more of SoC(s) 604 may include any number of cache(s) 612, including those described herein. For example, in at least one embodiment, cache(s) 612 could include a level three ("L3") cache that is available to both CPU(s) 606 and GPU(s) 608 (e.g., that is connected to CPU(s) 606 and GPU(s) 608). In at least one embodiment, cache(s) 612 may include a write-back cache that may keep track of states of lines, such as by using a cache coherence protocol (e.g., MEI, MESI, MSI, etc.). In at least one embodiment, a L3 cache may include 4 MB of memory or more, depending on embodiment, although smaller cache sizes may be used.

In at least one embodiment, one or more of SoC(s) 604 may include one or more accelerator(s) 614 (e.g., hardware accelerators, software accelerators, or a combination thereof). In at least one embodiment, SoC(s) 604 may include a hardware acceleration cluster that may include optimized hardware accelerators and/or large on-chip memory. In at least one embodiment, large on-chip memory (e.g., 4 MB of SRAM), may enable a hardware acceleration cluster to accelerate neural networks and other calculations. In at least one embodiment, a hardware acceleration cluster may be used to complement GPU(s) 608 and to off-load some of tasks of GPU(s) 608 (e.g., to free up more cycles of GPU(s) 608 for performing other tasks). In at least one embodiment, accelerator(s) 614 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 614 (e.g., hardware acceleration cluster) may include one or more deep learning accelerator ("DLA"). In at least one embodiment, DLA(s) may include, without limitation, one or more Tensor processing units ("TPUs") that may be configured to provide an additional ten trillion operations per second for deep learning applications and inferencing. In at least one embodiment, TPUs may be accelerators configured to, and optimized for, performing image processing functions (e.g., for CNNs, RCNNs, etc.). In at least one embodiment, DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

In at least one embodiment, DLA(s) may perform any function of GPU(s) 608, and by using an inference accelerator, for example, a designer may target either DLA(s) or GPU(s) 608 for any function. For example, in at least one embodiment, a designer may focus processing of CNNs and floating point operations on DLA(s) and leave other functions to GPU(s) 608 and/or accelerator(s) 614.

In at least one embodiment, accelerator(s) 614 may include programmable vision accelerator ("PVA"), which may alternatively be referred to herein as a computer vision accelerator. In at least one embodiment, PVA may be designed and configured to accelerate computer vision algorithms for advanced driver assistance system ("ADAS") 638, autonomous driving, augmented reality ("AR") applications, and/or virtual reality ("VR") applications. In at least one embodiment, PVA may provide a balance between performance and flexibility. For example, in at least one embodiment, each PVA may include, for example and without limitation, any number of reduced instruction set computer ("RISC") cores, direct memory access ("DMA"), and/or any number of vector processors.

In at least one embodiment, RISC cores may interact with image sensors (e.g., image sensors of any cameras described herein), image signal processor(s), etc. In at least one embodiment, each RISC core may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA to access system memory independently of CPU(s) 606. In at least one embodiment, DMA may support any number of features used to provide optimization to a PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, a PVA may include a PVA core and two vector processing subsystem partitions. In at least one embodiment, a PVA core may include a processor subsystem, DMA engine(s) (e.g., two DMA engines), and/or other peripherals. In at least one embodiment, a vector processing subsystem may operate as a primary processing engine of a PVA, and may include a vector processing unit ("VPU"), an instruction cache, and/or vector memory (e.g., "VMEM"). In at least one embodiment, VPU core may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute a common computer vision algorithm, but on different regions of an image. In at least one embodiment, vector processors included in a particular PVA may simultaneously execute different computer vision algorithms, on one image, or even execute different algorithms on sequential images or portions of an image. In at least one embodiment, among other things, any number of PVAs may be included in hardware acceleration cluster and any number of vector processors may be included in each PVA. In at least one embodiment, PVA may include additional error correcting code ("ECC") memory, to enhance overall system safety.

In at least one embodiment, accelerator(s) 614 may include a computer vision network on-chip and static random-access memory ("SRAM"), for providing a high-bandwidth, low latency SRAM for accelerator(s) 614. In at least one embodiment, on-chip memory may include at least 4 MB SRAM, comprising, for example and without limitation, eight field-configurable memory blocks, that may be accessible by both a PVA and a DLA. In at least one embodiment, each pair of memory blocks may include an advanced peripheral bus ("APB") interface, configuration circuitry, a controller, and a multiplexer. In at least one embodiment, any type of memory may be used. In at least one embodiment, a PVA and a DLA may access memory via a backbone that provides a PVA and a DLA with high-speed access to memory. In at least one embodiment, a backbone may include a computer vision network on-chip that interconnects a PVA and a DLA to memory (e.g., using APB).

In at least one embodiment, a computer vision network on-chip may include an interface that determines, before transmission of any control signal/address/data, that both a PVA and a DLA provide ready and valid signals. In at least one embodiment, an interface may provide for separate phases and separate channels for transmitting control signals/addresses/data, as well as burst-type communications for continuous data transfer In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 604 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 614 can have a wide array of uses for autonomous driving In at least one embodiment, a PVA may be used for key processing stages in ADAS and autonomous vehicles. In at least one embodiment, a PVA's capabilities are a good match for algorithmic domains needing predictable processing, at low power and low latency. In other words, a PVA performs well on semi-dense or dense regular computation, even on small data sets, which might require predictable run-times with low latency and low power. In at least one embodiment, such as in vehicle 600, PVAs might be designed to run classic computer vision algorithms, as they can be efficient at object detection and operating on integer math.

For example, according to at least one embodiment of technology, a PVA is used to perform computer stereo vision. In at least one embodiment, a semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, a PVA may perform computer stereo vision functions on inputs from two monocular cameras.

In at least one embodiment, a PVA may be used to perform dense optical flow. For example, in at least one embodiment, a PVA could process raw RADAR data (e.g., using a 4D Fast Fourier Transform) to provide processed RADAR data. In at least one embodiment, a PVA is used for time of flight depth processing, by processing raw time of flight data to provide processed time of flight data, for example.

In at least one embodiment, a DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, a confidence measure enables a system to make further decisions regarding which detections should be considered as true positive detections rather than false positive detections. In at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, a DLA may run a neural network for regressing confidence value. In at least one embodiment, neural network may take as its input at least some subset of parameters, such as bounding box dimensions, ground plane estimate obtained (e.g., from another subsystem), output from IMU sensor(s) 666 that correlates with vehicle 600 orientation, distance, 3D location estimates of object obtained from neural network and/or other sensors (e.g., LIDAR sensor(s) 664 or RADAR sensor(s) 660), among others.

In at least one embodiment, one or more of SoC(s) 604 may include data store(s) 616 (e.g., memory). In at least one embodiment, data store(s) 616 may be on-chip memory of SoC(s) 604, which may store neural networks to be executed on GPU(s) 608 and/or a DLA. In at least one embodiment, data store(s) 616 may be large enough in capacity to store multiple instances of neural networks for redundancy and safety. In at least one embodiment, data store(s) 616 may comprise L2 or L3 cache(s).

In at least one embodiment, one or more of SoC(s) 604 may include any number of processor(s) 610 (e.g., embedded processors). In at least one embodiment, processor(s) 66 may include a boot and power management processor that may be a dedicated processor and subsystem to handle boot power and management functions and related security enforcement. In at least one embodiment, a boot and power management processor may be a part of a boot sequence of SoC(s) 604 and may provide runtime power management services. In at least one embodiment, a boot power and management processor may provide clock and voltage programming, assistance in system low power state transitions, management of SoC(s) 604 thermals and temperature sensors, and/or management of SoC(s) 604 power states. In at least one embodiment, each temperature sensor may be implemented as a ring-oscillator whose output frequency is proportional to temperature, and SoC(s) 604 may use ring-oscillators to detect temperatures of CPU(s) 606, GPU(s) 608, and/or accelerator(s) 614. In at least one embodiment, if temperatures are determined to exceed a threshold, then a boot and power management processor may enter a temperature fault routine and put SoC(s) 604 into a lower power state and/or put vehicle 600 into a chauffeur to safe stop mode (e.g., bring vehicle 600 to a safe stop).

In at least one embodiment, processor(s) 610 may further include a set of embedded processors that may serve as an audio processing engine which may be an audio subsystem that enables full hardware support for multi-channel audio over multiple interfaces, and a broad and flexible range of audio I/O interfaces. In at least one embodiment, an audio processing engine is a dedicated processor core with a digital signal processor with dedicated RAM.

In at least one embodiment, processor(s) 610 may further include an always-on processor engine that may provide necessary hardware features to support low power sensor management and wake use cases. In at least one embodiment, an always-on processor engine may include, without limitation, a processor core, a tightly coupled RAM, supporting peripherals (e.g., timers and interrupt controllers), various I/O controller peripherals, and routing logic.

In at least one embodiment, processor(s) 610 may further include a safety cluster engine that includes, without limitation, a dedicated processor subsystem to handle safety management for automotive applications. In at least one embodiment, a safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 610 may further include a real-time camera engine that may include, without limitation, a dedicated processor subsystem for handling real-time camera management. In at least one embodiment, processor(s) 610 may further include a high-dynamic range signal processor that may include, without limitation, an image signal processor that is a hardware engine that is part of a camera processing pipeline.

In at least one embodiment, processor(s) 610 may include a video image compositor that may be a processing block (e.g., implemented on a microprocessor) that implements video post-processing functions needed by a video playback application to produce a final image for a player window. In at least one embodiment, a video image compositor may perform lens distortion correction on wide-view camera(s) 670, surround camera(s) 674, and/or on in-cabin monitoring camera sensor(s). In at least one embodiment, in-cabin monitoring camera sensor(s) are preferably monitored by a neural network running on another instance of SoC 604, configured to identify in cabin events and respond accordingly. In at least one embodiment, an in-cabin system may perform, without limitation, lip reading to activate cellular service and place a phone call, dictate emails, change a vehicle's destination, activate or change a vehicle's infotainment system and settings, or provide voice-activated web surfing. In at least one embodiment, certain functions are available to a driver when a vehicle is operating in an autonomous mode and are disabled otherwise.

In at least one embodiment, a video image compositor may include enhanced temporal noise reduction for both spatial and temporal noise reduction. For example, in at least one embodiment, where motion occurs in a video, noise reduction weights spatial information appropriately, decreasing weights of information provided by adjacent frames. In at least one embodiment, where an image or portion of an image does not include motion, temporal noise reduction performed by video image compositor may use information from a previous image to reduce noise in a current image.

In at least one embodiment, a video image compositor may also be configured to perform stereo rectification on input stereo lens frames. In at least one embodiment, a video image compositor may further be used for user interface composition when an operating system desktop is in use, and GPU(s) 608 are not required to continuously render new surfaces. In at least one embodiment, when GPU(s) 608 are powered on and active doing 3D rendering, a video image compositor may be used to offload GPU(s) 608 to improve performance and responsiveness.

In at least one embodiment, one or more SoC of SoC(s) 604 may further include a mobile industry processor interface ("MIPI") camera serial interface for receiving video and input from cameras, a high-speed interface, and/or a video input block that may be used for a camera and related pixel input functions. In at least one embodiment, one or more of SoC(s) 604 may further include an input/output controller(s) that may be controlled by software and may be used for receiving I/O signals that are uncommitted to a specific role.

In at least one embodiment, one or more of SoC(s) 604 may further include a broad range of peripheral interfaces to enable communication with peripherals, audio encoders/decoders ("codecs"), power management, and/or other devices. In at least one embodiment, SoC(s) 604 may be used to process data from cameras (e.g., connected over Gigabit Multimedia Serial Link and Ethernet channels), sensors (e.g., LIDAR sensor(s) 664, RADAR sensor(s) 660, etc. that may be connected over Ethernet channels), data from bus 602 (e.g., speed of vehicle 600, steering wheel position, etc.), data from GNSS sensor(s) 658 (e.g., connected over a Ethernet bus or a CAN bus), etc. In at least one embodiment, one or more SoC of SoC(s) 604 may further include dedicated high-performance mass storage controllers that may include their own DMA engines, and that may be used to free CPU(s) 606 from routine data management tasks.

In at least one embodiment, SoC(s) 604 may be an end-to-end platform with a flexible architecture that spans automation Levels 3-5, thereby providing a comprehensive functional safety architecture that leverages and makes efficient use of computer vision and ADAS techniques for diversity and redundancy, and provides a platform for a flexible, reliable driving software stack, along with deep learning tools. In at least one embodiment, SoC(s) 604 may be faster, more reliable, and even more energy-efficient and space-efficient than conventional systems. For example, in at least one embodiment, accelerator(s) 614, when combined with CPU(s) 606, GPU(s) 608, and data store(s) 616, may provide for a fast, efficient platform for Level 3-5 autonomous vehicles.

In at least one embodiment, computer vision algorithms may be executed on CPUs, which may be configured using a high-level programming language, such as C, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on a DLA or a discrete GPU (e.g., GPU(s) 620) may include text and word recognition, allowing reading and understanding of traffic signs, including signs for which a neural network has not been specifically trained. In at least one embodiment, a DLA may further include a neural network that is able to identify, interpret, and provide semantic understanding of a sign, and to pass that semantic understanding to path planning modules running on a CPU Complex.

In at least one embodiment, multiple neural networks may be run simultaneously, as for Level 3, 4, or 5 driving. For example, in at least one embodiment, a warning sign stating "Caution: flashing lights indicate icy conditions," along with an electric light, may be independently or collectively interpreted by several neural networks. In at least one embodiment, such warning sign itself may be identified as a traffic sign by a first deployed neural network (e.g., a neural network that has been trained), text "flashing lights indicate icy conditions" may be interpreted by a second deployed neural network, which informs a vehicle's path planning software (preferably executing on a CPU Complex) that when flashing lights are detected, icy conditions exist. In at least one embodiment, a flashing light may be identified by operating a third deployed neural network over multiple frames, informing a vehicle's path-planning software of a presence (or an absence) of flashing lights. In at least one embodiment, all three neural networks may run simultaneously, such as within a DLA and/or on GPU(s) 608.

In at least one embodiment, a CNN for facial recognition and vehicle owner identification may use data from camera sensors to identify presence of an authorized driver and/or owner of vehicle 600. In at least one embodiment, an always-on sensor processing engine may be used to unlock a vehicle when an owner approaches a driver door and turns on lights, and, in a security mode, to disable such vehicle when an owner leaves such vehicle. In this way, SoC(s) 604 provide for security against theft and/or carjacking.

In at least one embodiment, a CNN for emergency vehicle detection and identification may use data from microphones 696 to detect and identify emergency vehicle sirens. In at least one embodiment, SoC(s) 604 use a CNN for classifying environmental and urban sounds, as well as classifying visual data. In at least one embodiment, a CNN running on a DLA is trained to identify a relative closing speed of an emergency vehicle (e.g., by using a Doppler effect). In at least one embodiment, a CNN may also be trained to identify emergency vehicles specific to a local area in which a vehicle is operating, as identified by GNSS sensor(s) 658. In at least one embodiment, when operating in Europe, a CNN will seek to detect European sirens, and when in North America, a CNN will seek to identify only North American sirens. In at least one embodiment, once an emergency vehicle is detected, a control program may be used to execute an emergency vehicle safety routine, slowing a vehicle, pulling over to a side of a road, parking a vehicle, and/or idling a vehicle, with assistance of ultrasonic sensor(s) 662, until emergency vehicles pass.

In at least one embodiment, vehicle 600 may include CPU(s) 618 (e.g., discrete CPU(s), or dCPU(s)), that may be coupled to SoC(s) 604 via a high-speed interconnect (e.g., PCIe). In at least one embodiment, CPU(s) 618 may include an X86 processor, for example. CPU(s) 618 may be used to perform any of a variety of functions, including arbitrating potentially inconsistent results between ADAS sensors and SoC(s) 604, and/or monitoring status and health of controller(s) 636 and/or an infotainment system on a chip ("infotainment SoC") 630, for example.

In at least one embodiment, vehicle 600 may include GPU(s) 620 (e.g., discrete GPU(s), or dGPU(s)), that may be coupled to SoC(s) 604 via a high-speed interconnect (e.g., NVIDIA's NVLINK channel). In at least one embodiment, GPU(s) 620 may provide additional artificial intelligence functionality, such as by executing redundant and/or different neural networks, and may be used to train and/or update neural networks based at least in part on input (e.g., sensor data) from sensors of a vehicle 600.

In at least one embodiment, vehicle 600 may further include network interface 624 which may include, without limitation, wireless antenna(s) 626 (e.g., one or more wireless antennas for different communication protocols, such as a cellular antenna, a Bluetooth antenna, etc.). In at least one embodiment, network interface 624 may be used to enable wireless connectivity to Internet cloud services (e.g., with server(s) and/or other network devices), with other vehicles, and/or with computing devices (e.g., client devices of passengers). In at least one embodiment, to communicate with other vehicles, a direct link may be established between vehicle 600 and another vehicle and/or an indirect link may be established (e.g., across networks and over the Internet). In at least one embodiment, direct links may be provided using a vehicle-to-vehicle communication link. In at least one embodiment, a vehicle-to-vehicle communication link may provide vehicle 600 information about vehicles in proximity to vehicle 600 (e.g., vehicles in front of, on a side of, and/or behind vehicle 600). In at least one embodiment, such aforementioned functionality may be part of a cooperative adaptive cruise control functionality of vehicle 600.

In at least one embodiment, network interface 624 may include an SoC that provides modulation and demodulation functionality and enables controller(s) 636 to communicate over wireless networks. In at least one embodiment, network interface 624 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interfaces may include wireless functionality for communicating over LTE, WCDMA, UMTS, GSM, CDMA2000, Bluetooth, Bluetooth LE, WiFi, Z-Wave, ZigBee, LoRaWAN, and/or other wireless protocols.

In at least one embodiment, vehicle 600 may further include data store(s) 628 which may include, without limitation, off-chip (e.g., off SoC(s) 604) storage. In at least one embodiment, data store(s) 628 may include, without limitation, one or more storage elements including RAM, SRAM, dynamic random-access memory ("DRAM"), video random-access memory ("VRAM"), flash memory, hard disks, and/or other components and/or devices that may store at least one bit of data.

In at least one embodiment, vehicle 600 may further include GNSS sensor(s) 658 (e.g., GPS and/or assisted GPS sensors), to assist in mapping, perception, occupancy grid generation, and/or path planning functions. In at least one embodiment, any number of GNSS sensor(s) 658 may be used, including, for example and without limitation, a GPS using a Universal Serial Bus ("USB") connector with an Ethernet-to-Serial (e.g., RS-232) bridge.

In at least one embodiment, vehicle 600 may further include RADAR sensor(s) 660. In at least one embodiment, RADAR sensor(s) 660 may be used by vehicle 600 for long-range vehicle detection, even in darkness and/or severe weather conditions. In at least one embodiment, RADAR functional safety levels may be ASIL B. In at least one embodiment, RADAR sensor(s) 660 may use a CAN bus and/or bus 602 (e.g., to transmit data generated by RADAR sensor(s) 660) for control and to access object tracking data, with access to Ethernet channels to access raw data in some examples. In at least one embodiment, a wide variety of RADAR sensor types may be used. For example, and without limitation, RADAR sensor(s) 660 may be suitable for front, rear, and side RADAR use. In at least one embodiment, one or more sensor of RADAR sensors(s) 660 is a Pulse Doppler RADAR sensor.

In at least one embodiment, RADAR sensor(s) 660 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m (meter) range. In at least one embodiment, RADAR sensor(s) 660 may help in distinguishing between static and moving objects, and may be used by ADAS system 638 for emergency brake assist and forward collision warning. In at least one embodiment, sensors 660 (*s*) included in a long-range RADAR system may include, without limitation, monostatic multimodal RADAR with multiple (e.g., six or more) fixed RADAR antennae and a high-speed CAN and FlexRay interface. In at least one embodiment, with six antennae, a central four antennae may create a focused beam pattern, designed to record vehicle's 600 surroundings at higher speeds with minimal interference from traffic in adjacent lanes. In at least one embodiment, another two antennae may expand field of view, making it possible to quickly detect vehicles entering or leaving a lane of vehicle 600.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 660 designed to be installed at both ends of a rear bumper. When installed at both ends of a rear bumper, in at least one embodiment, a RADAR sensor system may create two beams that constantly monitor blind spots in a rear direction and next to a vehicle. In at least one embodiment, short-range RADAR systems may be used in ADAS system 638 for blind spot detection and/or lane change assist.

In at least one embodiment, vehicle 600 may further include ultrasonic sensor(s) 662. In at least one embodiment, ultrasonic sensor(s) 662, which may be positioned at a front, a back, and/or side location of vehicle 600, may be used for parking assist and/or to create and update an occupancy grid. In at least one embodiment, a wide variety of ultrasonic sensor(s) 662 may be used, and different ultrasonic sensor(s) 662 may be used for different ranges of detection (e.g., 2.5 m, 4 m). In at least one embodiment, ultrasonic sensor(s) 662 may operate at functional safety levels of ASIL B.

In at least one embodiment, vehicle 600 may include LIDAR sensor(s) 664. In at least one embodiment, LIDAR sensor(s) 664 may be used for object and pedestrian detection, emergency braking, collision avoidance, and/or other functions. In at least one embodiment, LIDAR sensor(s) 664 may operate at functional safety level ASIL B. In at least one embodiment, vehicle 600 may include multiple LIDAR sensors 664 (e.g., two, four, six, etc.) that may use an Ethernet channel (e.g., to provide data to a Gigabit Ethernet switch).

In at least one embodiment, LIDAR sensor(s) 664 may be capable of providing a list of objects and their distances for a 360-degree field of view. In at least one embodiment, commercially available LIDAR sensor(s) 664 may have an advertised range of approximately 100 m, with an accuracy of 2 cm to 3 cm, and with support for a 100 Mbps Ethernet connection, for example. In at least one embodiment, one or more non-protruding LIDAR sensors may be used. In such an embodiment, LIDAR sensor(s) 664 may include a small device that may be embedded into a front, a rear, a side, and/or a corner location of vehicle 600. In at least one embodiment, LIDAR sensor(s) 664, in such an embodiment, may provide up to a 120-degree horizontal and 35-degree vertical field of-view, with a 200 m range even for low-reflectivity objects. In at least one embodiment, front-mounted LIDAR sensor(s) 664 may be configured for a horizontal field of view between 45 degrees and 135 degrees.

In at least one embodiment, LIDAR technologies, such as 3D flash LIDAR, may also be used. In at least one embodiment, 3D flash LIDAR uses a flash of a laser as a transmission source, to illuminate surroundings of vehicle 600 up to approximately 200 m. In at least one embodiment, a flash LIDAR unit includes, without limitation, a receptor, which records laser pulse transit time and reflected light on each pixel, which in turn corresponds to a range from vehicle 600 to objects. In at least one embodiment, flash LIDAR may allow for highly accurate and distortion-free images of surroundings to be generated with every laser flash. In at least one embodiment, four flash LIDAR sensors may be deployed, one at each side of vehicle 600. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device may use a 5 nanosecond class I (eye-safe) laser pulse per frame and may capture reflected laser light as a 3D range point cloud and co-registered intensity data.

In at least one embodiment, vehicle 600 may further include IMU sensor(s) 666. In at least one embodiment, IMU sensor(s) 666 may be located at a center of a rear axle of vehicle 600. In at least one embodiment, IMU sensor(s) 666 may include, for example and without limitation, accelerometer(s), magnetometer(s), gyroscope(s), a magnetic compass, magnetic compasses, and/or other sensor types. In at least one embodiment, such as in six-axis applications, IMU sensor(s) 666 may include, without limitation, accelerometers and gyroscopes. In at least one embodiment, such as in nine-axis applications, IMU sensor(s) 666 may include, without limitation, accelerometers, gyroscopes, and magnetometers.

In at least one embodiment, IMU sensor(s) 666 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 666 may enable vehicle 600 to estimate its heading without requiring input from a magnetic sensor by directly observing and correlating changes in velocity from a GPS to IMU sensor(s) 666. In at least one embodiment, IMU sensor(s) 666 and GNSS sensor(s) 658 may be combined in a single integrated unit.

In at least one embodiment, vehicle 600 may include microphone(s) 696 placed in and/or around vehicle 600. In at least one embodiment, microphone(s) 696 may be used for emergency vehicle detection and identification, among other things.

In at least one embodiment, vehicle 600 may further include any number of camera types, including stereo camera(s) 668, wide-view camera(s) 670, infrared camera(s) 672, surround camera(s) 674, long-range camera(s) 698, mid-range camera(s) 676, and/or other camera types. In at least one embodiment, cameras may be used to capture image data around an entire periphery of vehicle 600. In at least one embodiment, which types of cameras used depends on vehicle 600. In at least one embodiment, any combination of camera types may be used to provide necessary coverage around vehicle 600. In at least one embodiment, a number of cameras deployed may differ depending on embodiment.

For example, in at least one embodiment, vehicle 600 could include six cameras, seven cameras, ten cameras, twelve cameras, or another number of cameras. In at least one embodiment, cameras may support, as an example and without limitation, Gigabit Multimedia Serial Link ("GMSL") and/or Gigabit Ethernet communications. In at least one embodiment, each camera might be as described with more detail previously herein with respect to FIG. 6A and FIG. 6B.

In at least one embodiment, vehicle 600 may further include vibration sensor(s) 642. In at least one embodiment, vibration sensor(s) 642 may measure vibrations of components of vehicle 600, such as axle(s). For example, in at least one embodiment, changes in vibrations may indicate a change in road surfaces. In at least one embodiment, when two or more vibration sensors 642 are used, differences between vibrations may be used to determine friction or slippage of road surface (e.g., when a difference in vibration is between a power-driven axle and a freely rotating axle).

In at least one embodiment, vehicle 600 may include ADAS system 638. In at least one embodiment, ADAS system 638 may include, without limitation, an SoC, in some examples. In at least one embodiment, ADAS system 638 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW)" system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 660, LIDAR sensor(s) 664, and/or any number of camera(s). In at least one embodiment, ACC system may include a longitudinal ACC system and/or a lateral ACC system. In at least one embodiment, a longitudinal ACC system monitors and controls distance to another vehicle immediately ahead of vehicle 600 and automatically adjusts speed of vehicle 600 to maintain a safe distance from vehicles ahead. In at least one embodiment, a lateral ACC system performs distance keeping, and advises vehicle 600 to change lanes when necessary. In at least one embodiment, a lateral ACC is related to other ADAS applications, such as LC and CW.

In at least one embodiment, a CACC system uses information from other vehicles that may be received via network interface 624 and/or wireless antenna(s) 626 from other vehicles via a wireless link, or indirectly, over a network connection (e.g., over the Internet) In at least one embodiment, direct links may be provided by a vehicle-to-vehicle ("V2V") communication link, while indirect links may be provided by an infrastructure-to-vehicle ("I2V") communication link. In general, V2V communication provides information about immediately preceding vehicles (e.g., vehicles immediately ahead of and in same lane as vehicle 600), while I2V communication provides information about traffic further ahead. In at least one embodiment, a CACC system may include either or both I2V and V2V information sources. In at least one embodiment, given information of vehicles ahead of vehicle 600, a CACC system may be more reliable and it has potential to improve traffic flow smoothness and reduce congestion on road.

In at least one embodiment, an FCW system is designed to alert a driver to a hazard, so that such driver may take corrective action. In at least one embodiment, an FCW system uses a front-facing camera and/or RADAR sensor(s) 660, coupled to a dedicated processor, digital signal processor ("DSP"), FPGA, and/or ASIC, that is electrically coupled to provide driver feedback, such as a display, speaker, and/or vibrating component. In at least one embodiment, an FCW system may provide a warning, such as in form of a sound, visual warning, vibration and/or a quick brake pulse.

In at least one embodiment, an AEB system detects an impending forward collision with another vehicle or other object, and may automatically apply brakes if a driver does not take corrective action within a specified time or distance parameter. In at least one embodiment, AEB system may use front-facing camera(s) and/or RADAR sensor(s) 660, coupled to a dedicated processor, DSP, FPGA, and/or ASIC. In at least one embodiment, when an AEB system detects a hazard, it will typically first alert a driver to take corrective action to avoid collision and, if that driver does not take corrective action, that AEB system may automatically apply brakes in an effort to prevent, or at least mitigate, an impact of a predicted collision. In at least one embodiment, an AEB system may include techniques such as dynamic brake support and/or crash imminent braking.

In at least one embodiment, an LDW system provides visual, audible, and/or tactile warnings, such as steering wheel or seat vibrations, to alert driver when vehicle 600 crosses lane markings. In at least one embodiment, an LDW system does not activate when a driver indicates an intentional lane departure, such as by activating a turn signal. In at least one embodiment, an LDW system may use front-side facing cameras, coupled to a dedicated processor, DSP, FPGA, and/or ASIC, that is electrically coupled to provide driver feedback, such as a display, speaker, and/or vibrating component. In at least one embodiment, an LKA system is a variation of an LDW system. In at least one embodiment, an LKA system provides steering input or braking to correct vehicle 600 if vehicle 600 starts to exit its lane.

In at least one embodiment, a BSW system detects and warns a driver of vehicles in an automobile's blind spot. In at least one embodiment, a BSW system may provide a visual, audible, and/or tactile alert to indicate that merging or changing lanes is unsafe. In at least one embodiment, a BSW system may provide an additional warning when a driver uses a turn signal. In at least one embodiment, a BSW system may use rear-side facing camera(s) and/or RADAR sensor(s) 660, coupled to a dedicated processor, DSP, FPGA, and/or ASIC, that is electrically coupled to driver feedback, such as a display, speaker, and/or vibrating component.

In at least one embodiment, an RCTW system may provide visual, audible, and/or tactile notification when an object is detected outside a rear-camera range when vehicle 600 is backing up. In at least one embodiment, an RCTW system includes an AEB system to ensure that vehicle brakes are applied to avoid a crash. In at least one embodiment, an RCTW system may use one or more rear-facing RADAR sensor(s) 660, coupled to a dedicated processor, DSP, FPGA, and/or ASIC, that is electrically coupled to provide driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert a driver and allow that driver to decide whether a safety condition truly exists and act accordingly. In at least one embodiment, vehicle 600 itself decides, in case of conflicting results, whether to heed result from a primary computer or a secondary computer (e.g., a first controller or a second controller of controllers 636). For example, in at least one embodiment, ADAS system 638 may be a backup and/or secondary computer for providing perception information to a backup computer rationality module In at least one embodiment, a backup computer rationality monitor may run redundant diverse software on hardware components to detect faults in perception and dynamic driving tasks. In at least one embodiment, outputs from ADAS system 638 may be provided to a supervisory MCU. In at least one embodiment, if outputs from a primary computer and outputs from a secondary computer conflict, a supervisory MCU determines how to reconcile conflict to ensure safe operation.

In at least one embodiment, a primary computer may be configured to provide a supervisory MCU with a confidence score, indicating that primary computer's confidence in a chosen result. In at least one embodiment, if that confidence score exceeds a threshold, that supervisory MCU may follow that primary computer's direction, regardless of whether that secondary computer provides a conflicting or inconsistent result. In at least one embodiment, where a confidence score does not meet a threshold, and where primary and secondary computers indicate different results (e.g., a conflict), a supervisory MCU may arbitrate between computers to determine an appropriate outcome.

In at least one embodiment, a supervisory MCU may be configured to run a neural network(s) that is trained and configured to determine, based at least in part on outputs from a primary computer and outputs from a secondary computer, conditions under which that secondary computer provides false alarms. In at least one embodiment, neural network(s) in a supervisory MCU may learn when a secondary computer's output may be trusted, and when it cannot. For example, in at least one embodiment, when that secondary computer is a RADAR-based FCW system, a neural network(s) in that supervisory MCU may learn when an FCW system is identifying metallic objects that are not, in fact, hazards, such as a drainage grate or manhole cover that triggers an alarm. In at least one embodiment, when a secondary computer is a camera-based LDW system, a neural network in a supervisory MCU may learn to override LDW when bicyclists or pedestrians are present and a lane departure is, in fact, a safest maneuver. In at least one embodiment, a supervisory MCU may include at least one of a DLA or a GPU suitable for running neural network(s) with associated memory. In at least one embodiment, a supervisory MCU may comprise and/or be included as a component of SoC(s) 604.

In at least one embodiment, ADAS system 638 may include a secondary computer that performs ADAS functionality using traditional rules of computer vision. In at least one embodiment, that secondary computer may use classic computer vision rules (if-then), and presence of a neural network(s) in a supervisory MCU may improve reliability, safety and performance. For example, in at least one embodiment, diverse implementation and intentional non-identity makes an overall system more fault-tolerant, especially to faults caused by software (or software-hardware interface) functionality. For example, in at least one embodiment, if there is a software bug or error in software running on a primary computer, and non-identical software code running on a secondary computer provides a consistent overall result, then a supervisory MCU may have greater confidence that an overall result is correct, and a bug in software or hardware on that primary computer is not causing a material error.

In at least one embodiment, an output of ADAS system 638 may be fed into a primary computer's perception block and/or a primary computer's dynamic driving task block. For example, in at least one embodiment, if ADAS system 638 indicates a forward crash warning due to an object immediately ahead, a perception block may use this information when identifying objects. In at least one embodiment, a secondary computer may have its own neural network that is trained and thus reduces a risk of false positives, as described herein.

In at least one embodiment, vehicle 600 may further include infotainment SoC 630 (e.g., an in-vehicle infotainment system (IVI)). Although illustrated and described as an SoC, infotainment system SoC 630, in at least one embodiment, may not be an SoC, and may include, without limitation, two or more discrete components. In at least one embodiment, infotainment SoC 630 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 600. For example, infotainment SoC 630 could include radios, disk players, navigation systems, video players, USB and Bluetooth connectivity, carputers, in-car entertainment, WiFi, steering wheel audio controls, hands free voice control, a heads-up display ("HUD"), HMI display 634, a telematics device, a control panel (e.g., for controlling and/or interacting with various components, features, and/or systems), and/or other components. In at least one embodiment, infotainment SoC 630 may further be used to provide information (e.g., visual and/or audible) to user(s) of vehicle 600, such as information from ADAS system 638, autonomous driving information such as planned vehicle maneuvers, trajectories, surrounding environment information (e.g., intersection information, vehicle information, road information, etc.), and/or other information.

In at least one embodiment, infotainment SoC 630 may include any amount and type of GPU functionality. In at least one embodiment, infotainment SoC 630 may communicate over bus 602 with other devices, systems, and/or components of vehicle 600. In at least one embodiment, infotainment SoC 630 may be coupled to a supervisory MCU such that a GPU of an infotainment system may perform some self-driving functions in event that primary controller(s) 636 (e.g., primary and/or backup computers of vehicle 600) fail. In at least one embodiment, infotainment SoC 630 may put vehicle 600 into a chauffeur to safe stop mode, as described herein.

In at least one embodiment, vehicle 600 may further include instrument cluster 632 (e.g., a digital dash, an electronic instrument cluster, a digital instrument panel, etc.). In at least one embodiment, instrument cluster 632 may include, without limitation, a controller and/or supercomputer (e.g., a discrete controller or supercomputer). In at least one embodiment, instrument cluster 632 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 630 and instrument cluster 632. In at least one embodiment, instrument cluster 632 may be included as part of infotainment SoC 630, or vice versa.

Various processing devices in FIG. 6C, e.g., SoCs 1004 and GPUs may have inference and/or training logic that is used to perform inferencing and/or training operations associated with one or more embodiments. In at least one embodiment, the inference and/or training logic may be used in system FIG. 6C for inferencing or predicting operations based, at least in part, on weight parameters calculated using neural network training operations, neural network functions and/or architectures, or neural network use cases described herein.

FIG. 6D is a diagram of a system 678 for communication between cloud-based server(s) and autonomous vehicle 600 of FIG. 6A, according to at least one embodiment. In at least one embodiment, system 678 may include, without limitation, server(s) 678, network(s) 690, and any number and type of vehicles, including vehicle 600. In at least one embodiment, server(s) 678 may include, without limitation, a plurality of GPUs 684(A)-684(H) (collectively referred to herein as GPUs 684), PCIe switches 682(A)-682(D) (collectively referred to herein as PCIe switches 682), and/or CPUs 680(A)-680(B) (collectively referred to herein as CPUs 680). In at least one embodiment, GPUs 684, CPUs 680, and PCIe switches 682 may be interconnected with high-speed interconnects such as, for example and without limitation, NVLink interfaces 688 developed by NVIDIA and/or PCIe connections 686. In at least one embodiment, GPUs 684 are connected via an NVLink and/or NVSwitch SoC and GPUs 684 and PCIe switches 682 are connected via PCIe interconnects. Although eight GPUs 684, two CPUs 680, and four PCIe switches 682 are illustrated, this is not intended to be limiting. In at least one embodiment, each of server(s) 678 may include, without limitation, any number of GPUs 684, CPUs 680, and/or PCIe switches 682, in any combination. For example, in at least one embodiment, server(s) 678 could each include eight, sixteen, thirty-two, and/or more GPUs 684.

In at least one embodiment, server(s) 678 may receive, over network(s) 690 and from vehicles, image data representative of images showing unexpected or changed road conditions, such as recently commenced road-work. In at least one embodiment, server(s) 678 may transmit, over network(s) 690 and to vehicles, neural networks 692, updated or otherwise, and/or map information 694, including, without limitation, information regarding traffic and road conditions. In at least one embodiment, updates to map information 694 may include, without limitation, updates for HD map 622, such as information regarding construction sites, potholes, detours, flooding, and/or other obstructions. In at least one embodiment, neural networks 692, and/or map information 694 may have resulted from new training and/or experiences represented in data received from any number of vehicles in an environment, and/or based at least in part on training performed at a data center (e.g., using server(s) 678 and/or other servers).

In at least one embodiment, server(s) 678 may be used to train machine learning models (e.g., neural networks) based at least in part on training data. In at least one embodiment, training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 690), and/or machine learning models may be used by server(s) 678 to remotely monitor vehicles.

In at least one embodiment, server(s) 678 may receive data from vehicles and apply data to up-to-date real-time neural networks for real-time intelligent inferencing. In at least one embodiment, server(s) 678 may include deep-learning supercomputers and/or dedicated AI computers powered by GPU(s) 684, such as a DGX and DGX Station machines developed by NVIDIA. However, in at least one embodiment, server(s) 678 may include deep learning infrastructure that uses CPU-powered data centers.

In at least one embodiment, deep-learning infrastructure of server(s) 678 may be capable of fast, real-time inferencing, and may use that capability to evaluate and verify health of processors, software, and/or associated hardware in vehicle 600. For example, in at least one embodiment, deep-learning infrastructure may receive periodic updates from vehicle 600, such as a sequence of images and/or objects that vehicle 600 has located in that sequence of images (e.g., via computer vision and/or other machine learning object classification techniques). In at least one embodiment, deep-learning infrastructure may run its own neural network to identify objects and compare them with objects identified by vehicle 600 and, if results do not match and deep-learning infrastructure concludes that AI in vehicle 600 is malfunctioning, then server(s) 678 may transmit a signal to vehicle 600 instructing a fail-safe computer of vehicle 600 to assume control, notify passengers, and complete a safe parking maneuver.

In at least one embodiment, server(s) 678 may include GPU(s) 684 and one or more programmable inference accelerators (e.g., NVIDIA's TensorRT 3 devices). In at least one embodiment, a combination of GPU-powered servers and inference acceleration may make real-time responsiveness possible In at least one embodiment, such as where performance is less critical, servers powered by CPUs, FPGAs, and other processors may be used for inferencing.

Computer Device Architecture

Figure 7:
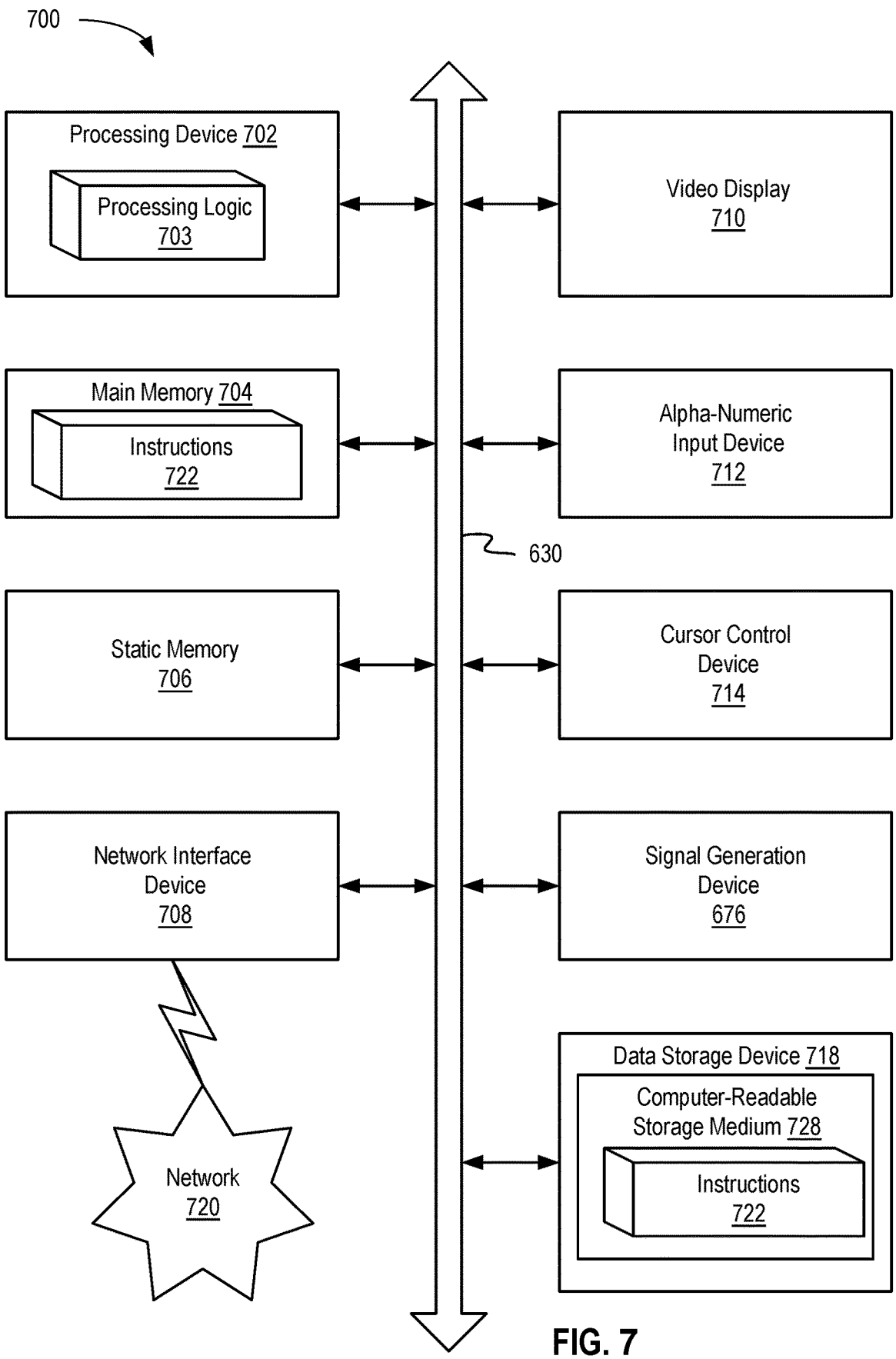
FIG. 7 depicts a block diagram of an example computer device capable of supporting staggered authentication of sensor data in real-time streaming applications, according to at least one embodiment.

FIG. 7 depicts a block diagram of an example computer device 700 capable of supporting staggered authentication of sensor data in real-time streaming applications, according to at least one embodiment. Example computer device 700 can be connected to other computer devices in a LAN, an intranet, an extranet, and/or the Internet. Computer device 700 can operate in the capacity of a server in a client-server network environment. Computer device 700 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 700 can include a processing device 702 (also referred to as a processor or CPU), a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which can communicate with each other via a bus 730.

Processing device 702 (which can include processing logic 703) represents one or more general-purpose processing devices such as a microprocessor, central processing unit, or the like. More particularly, processing device 702 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 702 can be configured to execute instructions executing methods 400-500 of sub-unit data authentication in live streaming and/or time-sensitive applications.

Example computer device 700 can further comprise a network interface device 708, which can be communicatively coupled to a network 720. Example computer device 700 can further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 716 (e.g., a speaker).

Data storage device 718 can include a computer-readable storage medium (or, more specifically, a non-transitory computer-readable storage medium) 728 on which is stored one or more sets of executable instructions 722. In accordance with one or more aspects of the present disclosure, executable instructions 722 can comprise executable instructions executing methods 400-500 of sub-unit data authentication in live streaming and/or time-sensitive applications.

Executable instructions 722 can also reside, completely or at least partially, within main memory 704 and/or within processing device 702 during execution thereof by example computer device 700, main memory 704 and processing device 702 also constituting computer-readable storage media. Executable instructions 722 can further be transmitted or received over a network via network interface device 708.

While the computer-readable storage medium 728 is shown in FIG. 7 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities Unless specifically stated otherwise, as apparent from the following discussion, it is appreciated that throughout the description, discussions utilizing terms such as "identifying," "determining," "storing," "adjusting," "causing," "returning," "comparing." "creating," "stopping," "loading," "copying." "throwing," "replacing." "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:
a plurality of sensors;
one or more memory devices; and
one or more processors communicatively coupled to the one or more memory devices, the one or more processors to:
establish an authentication schedule for the plurality of sensors;
receive a plurality of units of data from the plurality of sensors over a plurality of times;
for at least one time of the plurality of times:
receive a plurality of sub-units of data, individual sub-units being received from respective sensors of the plurality of sensors;
select, using the authentication schedule, a predetermined number of one or more sub-units of data from the plurality of sub-units of data; and
perform an authentication of the one or more selected sub-units of data; and
determine authenticity of the plurality of units of data using the performed authentications of the sub-units of data.

2. The system of claim 1, wherein a unit of data of the plurality of units of data comprises an image frame.

3. The system of claim 1, wherein, to perform the authentication of the sub-units of data, the one or more processors are to compute one or more authentication values using at least one cryptographic key associated with at least one sensor of the plurality of sensors.

4. The system of claim 3, wherein, to perform the authentication of the sub-units of data, the one or more processors further to compare the one or more computed authentication values with one or more authentication values received from the plurality of sensors.

5. The system of claim 1, wherein the plurality of sensors are agnostic about the authentication schedule, and wherein the predetermined number is less than a number of authenticated sub-units of data received from the plurality of sensors.

6. The system of claim 1, wherein the predetermined number is one.

7. The system of claim 1, wherein the plurality of sensors comprises N sensors, wherein an individual unit of data comprises M sub-units of data, and wherein the predetermined number is N/M.

8. The system of claim 1, wherein the plurality of units of data are received from the plurality of sensors via one or more of a MIPI CSI communication link, a GMSL link, an FPD link, or an Ethernet link.

9. The system of claim 1, wherein to establish the authentication schedule for the plurality of sensors, the one or more processors are to:
generate a pseudorandom value; and
establish the authentication schedule using the generated pseudorandom value.

10. The system precessing device of claim 1, wherein the authentication schedule is modified at least once during a continuous operation of the plurality of sensors.

11. The system of claim 1, wherein the one or more processors are further to:
responsive to one or more units of data of the plurality of units of data being authentic, provide the one or more authenticated units of data to a host application.

12. The system of claim 1, wherein the system is comprised in at least one of:

a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system for generating or presenting at least one of augmented reality content, virtual reality content, or mixed reality content;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

13. A method comprising:
establishing an authentication schedule for a plurality of sensors;
receiving a plurality of units of data from the plurality of sensors over a plurality of times, the receiving the plurality of units of data including, for at least one time of the plurality of times:
receiving a plurality of sub-units of data, individual sub-units being received from respective sensors of the plurality of sensors;
selecting, using the authentication schedule, a predetermined number of one or more sub-units of data from the plurality of received sub-units of data; and
performing an authentication of the one or more selected sub-units of data; and
determining authenticity of the plurality of units of data using the performed authentications of the sub-units of data.

14. A system comprising:
a plurality of sensors to generate a plurality of units of data over a plurality of times;
one or more memory devices; and
one or more processors communicatively coupled to the one or more memory devices, the one or more processors to:
establish an authentication schedule for the plurality of sensors;
receive, from the plurality of sensors, the plurality of units of data;
for at least one time of the plurality of times:
receive a plurality of sub-units of data, individual sub-units being received from respective sensors of the plurality of sensors;
select, using the authentication schedule, a predetermined number of one or more sub-units of data from the plurality of sub-units of data; and
perform an authentication of the one or more selected sub-units of data; and
determine authenticity of the plurality of units of data using the performed authentications of the sub-units of data.

15. The system of claim 14, wherein a unit of data of the plurality of units of data comprises an image frame.

16. The system of claim 14, wherein, to perform the authentication of the sub-units of data, the one or more processors are to:
compute one or more authentication values using at least one cryptographic key associated with at least one sensor of the plurality of sensors; and
compare the one or more computed authentication values with one or more authentication values received from the plurality of sensors.

17. The system of claim 14, wherein the plurality of sensors are agnostic about the authentication schedule, and wherein the predetermined number is less than a number of authenticated sub-units of data received from the plurality of sensors.

18. The system of claim 14, wherein the plurality of sensors comprises N sensors, wherein an individual unit of data comprises M sub-units of data, and wherein the predetermined number is N/M.

19. The system of claim 14, wherein the plurality of units of data are received from the plurality of sensors via one or more of a MIPI CSI communication link, a GMSL link, an FPD link, or an Ethernet link.

20. The system of claim 14, wherein the authentication schedule is modified at least once during a continuous operation of the plurality of sensors.

* * * * *